United States Patent
Collins et al.

(10) Patent No.: US 9,934,510 B2
(45) Date of Patent: *Apr. 3, 2018

(54) ARCHITECTURE FOR DISTRIBUTION OF ADVERTISING CONTENT AND CHANGE PROPAGATION

(75) Inventors: Robert J. Collins, Carlsbad, CA (US); Scott Melvin Harvester, San Marcos, CA (US); Paul Joseph Apodaca, Carlsbad, CA (US)

(73) Assignee: EXCALIBUR IP, LLC, New York, NY (US)

( * ) Notice: Subject to any disclaimer, the term of this patent is extended or adjusted under 35 U.S.C. 154(b) by 1773 days.

This patent is subject to a terminal disclaimer.

(21) Appl. No.: 11/490,467

(22) Filed: Jul. 19, 2006

(65) Prior Publication Data
US 2007/0033105 A1 Feb. 8, 2007

Related U.S. Application Data

(63) Continuation of application No. 11/324,129, filed on Dec. 30, 2005.
(Continued)

(51) Int. Cl.
*G06Q 30/00* (2012.01)
*G06Q 30/02* (2012.01)
*G06Q 10/06* (2012.01)

(52) U.S. Cl.
CPC ......... *G06Q 30/02* (2013.01); *G06Q 10/0631* (2013.01); *G06Q 30/0212* (2013.01);
(Continued)

(58) Field of Classification Search
CPC .................................................. G06Q 30/02
(Continued)

(56) References Cited

U.S. PATENT DOCUMENTS

| | | | | |
|---|---|---|---|---|
| 6,009,410 A * | 12/1999 | LeMole et al. | ............ | 705/14.54 |
| 7,134,044 B2 * | 11/2006 | Day et al. | ......................... | 714/6 |
| 7,310,686 B2 * | 12/2007 | Uysal | ............................ | 709/245 |
| 7,363,302 B2 * | 4/2008 | Lester | .............................. | 707/7 |
| 2001/0053999 A1 * | 12/2001 | Feinberg | ........................ | 705/14 |
| 2002/0052942 A1 * | 5/2002 | Swildens et al. | ............. | 709/223 |

(Continued)

OTHER PUBLICATIONS

Storage management solutions for distributed computing environments; Lomb, Reiner; Emo, Kelly A; VanDoorn, Roy M. Hewlett-Packard Journal 47.n5: p81(9). Hewlett 1996).*

*Primary Examiner* — Kambiz Abdi
*Assistant Examiner* — Michael R Stibley
(74) *Attorney, Agent, or Firm* — Brinks Gilson & Lione

(57) ABSTRACT

A system comprises an interface for enabling a user having a web property to input advertisement information including a web property advertisement, criteria indicating when presentation of the advertisement is desired by the user, a bid for the presentation of the advertisement when the criteria are met, and subsequent modifications to the advertisement information; geographically distributed servers, a plurality of the geographically distributed servers for storing the advertisement information, at least one of the geographically distributed servers for receiving a request for advertisement content from an advertising channel, at least one of the geographically distributed servers for determining whether the request meets the criteria, and at least one of the geographically distributed servers for forwarding the advertisement to the advertising channel in response to the request when the criteria have been met; and a distribution component for propagating the advertisement information to the geographically distributed servers according to an arrangement.

35 Claims, 18 Drawing Sheets

Related U.S. Application Data

(60) Provisional application No. 60/703,904, filed on Jul. 29, 2005.

(52) U.S. Cl.
CPC ..... *G06Q 30/0243* (2013.01); *G06Q 30/0244* (2013.01); *G06Q 30/0249* (2013.01); *G06Q 30/0253* (2013.01); *G06Q 30/0255* (2013.01); *G06Q 30/0256* (2013.01); *G06Q 30/0257* (2013.01); *G06Q 30/0263* (2013.01); *G06Q 30/0269* (2013.01); *G06Q 30/0275* (2013.01)

(58) Field of Classification Search
USPC .......................................................... 705/14
See application file for complete search history.

(56) References Cited

U.S. PATENT DOCUMENTS

| | | | |
|---|---|---|---|
| 2002/0133491 A1* | 9/2002 | Sim | G06F 17/30067 |
| 2002/0138832 A1* | 9/2002 | Svoboda | 725/36 |
| 2003/0070167 A1* | 4/2003 | Holtz et al. | 725/32 |
| 2003/0083937 A1* | 5/2003 | Hasegawa et al. | 705/14 |
| 2003/0149622 A1* | 8/2003 | Singh et al. | 705/14 |
| 2004/0143843 A1* | 7/2004 | Khoo et al. | 725/34 |
| 2005/0033641 A1* | 2/2005 | Jha | G06Q 30/02 705/14.53 |
| 2006/0190401 A1* | 8/2006 | Akadiri | 705/50 |
| 2006/0212361 A1* | 9/2006 | Perkowski | 705/26 |
| 2006/0242013 A1* | 10/2006 | Agarwal | G06Q 30/02 705/14.49 |

\* cited by examiner

ARCHITECTURE FOR DISTRIBUTION OF ADVERTISING CONTENT AND CHANGE PROPAGATION

PRIORITY CLAIM

This applications is a continuation of and incorporates by reference U.S. patent application Ser. No. 11/324,129, entitled "System and Method for Advertising Management," filed on Dec. 30, 2005, by inventors Robert J. Collins, et al., which claims priority to U.S. Provisional Patent Application Ser. No. 60/703,904, entitled "SYSTEM AND METHOD ALLOWING INFORMATION PROVIDER ACCESS TO A NETWORKED DATABASE SEARCH SYSTEM," filed on Jul. 29, 2005, the disclosure of which is hereby incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

This invention relates in general to advertising, and in particular to advertising campaign management and optimization systems, methods and apparatuses.

BACKGROUND OF INVENTION

The success of advertising campaigns depends on making efficient use of an advertising budget so as to maximally influence audience behavior. For example, if a campaign is directed to selling a product, then the advertiser may seek to use a given budget to purchase advertising so as to cause a maximum amount of consumers to purchase the product. Determining how to efficiently and optimally spend an advertising budget, as well as implementing and managing an ongoing advertising campaign (or campaigns) utilizing such a budget, however, can pose a daunting challenge to advertisers.

Increasingly, advertising campaigns include online or Internet-based advertising. With ever-increasing Internet use, it is only natural that greater advertising resources are directed to this audience. Furthermore, Internet-based advertising allows great opportunities for advertisers to deliver more targeted, relevant ads than conventional, off-line advertising techniques, such as billboards, newspapers and the like.

An increasingly important area of advertising includes sponsored listings. Such listing can be presented, for example, in the form of sponsored links appearing among the results of a search conducted on an Internet-based search engine, such as Yahoo!, Ask Jeeves, etc. For instance, auction-based systems exist in which advertisers bid on-line to be included among the sponsored search results for a particular search term or terms, and for the ranking or prominence of the placement of their sponsored listing among such results.

Online advertisers participating in such an auction-based system may face the challenge of managing and optimizing potentially frequent bidding on, for example, each of thousands or hundreds of thousands of search terms or groups of search terms. Moreover, an advertiser may need to manage and optimize numerous advertising campaigns across numerous disparate portals. Furthermore, an advertiser may need to manage and optimize off-line components of an advertising campaign or campaigns. All this, while the advertiser's skills and energies are needed and may be better suited for many other different business tasks.

Existing techniques for managing and optimizing advertising campaigns fall far short of providing efficient, effective solutions to these problems. Therefore, there is a need in the art for systems and methods for managing and optimizing advertising campaigns.

SUMMARY OF THE INVENTION

The present invention is directed towards systems and methods for optimizing and managing advertising campaigns. According to one embodiment, the present invention provides a system comprises an interface for enabling a user, the user being coupled to a network and having a web property to advertise, to input advertisement information including an advertisement for the web property, criteria indicating when presentation of the advertisement is desired by the user, a bid for the presentation of the advertisement when the criteria are met, and subsequent modifications to the advertisement information; geographically distributed servers, each server coupled to the network, a plurality of the geographically distributed servers for storing the advertisement information, at least one of the geographically distributed servers for receiving a request for advertisement content from an advertising channel, at least one of the geographically distributed servers for determining whether the request for advertisement content meets the criteria, and at least one of the geographically distributed servers for forwarding the advertisement to the advertising channel in response to the request when the criteria have been met; and a distribution component coupled to the network for propagating the advertisement information to the geographically distributed servers according to a predetermined arrangement.

The interface may include a user interface or an application program interface. The user may include an advertiser or an agency. The user may have a plurality of web properties to advertise, and the advertisement information may include an advertisement for each web property, dedicated criteria for each web property, and a dedicated bid for each web property. The interface may be capable of enabling a second user, the second user being coupled to the network and having a second web property to advertise, to input second advertisement information including a second advertisement for the second web property, second criteria indicating when presentation of the second advertisement is desired by the second user, a second bid for the presentation of the second advertisement when the second criteria are met, and subsequent modifications to the second advertisement information. The geographically distributed servers may be capable of storing the second advertisement, the second criteria, and the second bid. At least one of the geographically distributed servers may prioritize one of the web property or the second web property based on a comparison of the bid and the second bid, when the criteria and the second criteria are met. At least one of the geographically distributed servers may have a tool for monitoring the behavior of a visitor of the web property. The tool may implement at least one of tagging, data tracking, program code, navigation code, a cookie, and a redirection server. The tool may be capable of generating performance information from the monitored visitor behavior. At least one of the geographically distributed servers may enable modification of the criteria or the bid based on the performance information. The geographically distributed servers may include geographically distributed pods, at least one pod storing account information of the user. The request for the advertisement content may include at least one of a banner ad request, a content match request and a sponsored match request. Each of the plurality of geographically distributed servers may store at least a portion of the advertisement information and the plurality of geographically distributed servers in combination may store the advertisement information. The plurality of geographically distributed servers may store the advertisement information with some redundancy.

According to another embodiment, the present invention provides a method comprising providing geographically distributed servers coupled to a network; enabling a user, the user being coupled to the network and having a web property to advertise, to input advertisement information including an advertisement for the web property, criteria indicating when presentation of the advertisement is desired by the user, a bid for the presentation of the advertisement when the criteria are met, and subsequent modifications to the advertisement information; storing the advertisement information at a plurality of the geographically distributed servers; receiving at one of the geographically distributed servers a request for advertisement content from an advertising channel; determining by one of the geographically distributed servers whether the request for advertisement content meets the criteria; forwarding by one of the geographically distributed servers the advertisement to the advertising channel in response to the request when the criteria have been met; and propagating the advertisement information by a distribution component coupled to the network to the geographically distributed servers according to a predetermined arrangement.

The enabling may include using a user interface or an application program interface. The user may include an advertiser or an agency. The user may have a plurality of web properties to advertise, and the advertisement information may include an advertisement for each web property, dedicated criteria for each web property, and a dedicated bid for each web property. The method may further comprise enabling a second user, the second user being coupled to the network and having a second web property to advertise, to input second advertisement information including a second advertisement for the second web property, second criteria indicating when presentation of the second advertisement is desired by the second user, a second bid for the presentation of the second advertisement when the second criteria are met, and subsequent modifications to the second advertisement information; storing the second advertisement information at a second plurality of geographically distributed servers; and prioritizing by one of the geographically distributed servers one of the web property or the second web property based on a comparison of the bid and the second bid, when the criteria and the second criteria are met. The method may further comprise using a tool by one of the geographically distributed servers to monitor the behavior of a visitor of the web property. The tool may implement at least one of tagging, data tracking, program code, navigation code, a cookie, and a redirection server. The method may further comprise generating performance information from the monitored visitor behavior. The method may further comprise enabling one of the geographically distributed servers to modify the criteria or the bid based on the performance information. The geographically distributed servers may includes geographically distributed pods, at least one pod storing account information of the user. The request for the advertisement content may include at least one of a banner ad request, a content match request and a sponsored match request. Each of the plurality of the geographically distributed servers may store at least a portion of the advertisement information, and the plurality of the geographically distributed servers in combination may store the advertisement information. The plurality of the geographically distributed servers may store the advertisement information with some redundancy.

According to yet another embodiment, the present invention provides a system comprising geographically distributed servers coupled to a network; means for enabling a user, the user being coupled to the network and having a web property to advertise, to input advertisement information including an advertisement for the web property, criteria indicating when presentation of the advertisement is desired by the user, a bid for the presentation of the advertisement when the criteria are met, and subsequent modifications to the advertisement information; means for storing the advertisement information at a plurality of the geographically distributed servers; means for receiving at one of the geographically distributed servers a request for advertisement content from an advertising channel; means for determining by one of the geographically distributed servers whether the request for advertisement content meets the criteria; means for forwarding by one of the geographically distributed servers the advertisement to the advertising channel in response to the request when the criteria have been met; and means for propagating the advertisement information by a distribution component coupled to the network to the geographically distributed servers according to a predetermined arrangement.

BRIEF DESCRIPTION OF DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

In the following description of the various embodiments of the present invention, reference is made to the accompanying drawings that form a part hereof, and in which is shown by way of illustration various embodiments of the present invention. It is to be understood that other embodiments may be utilized and structural changes may be made without departing from the scope of the present invention.

Figure 1:
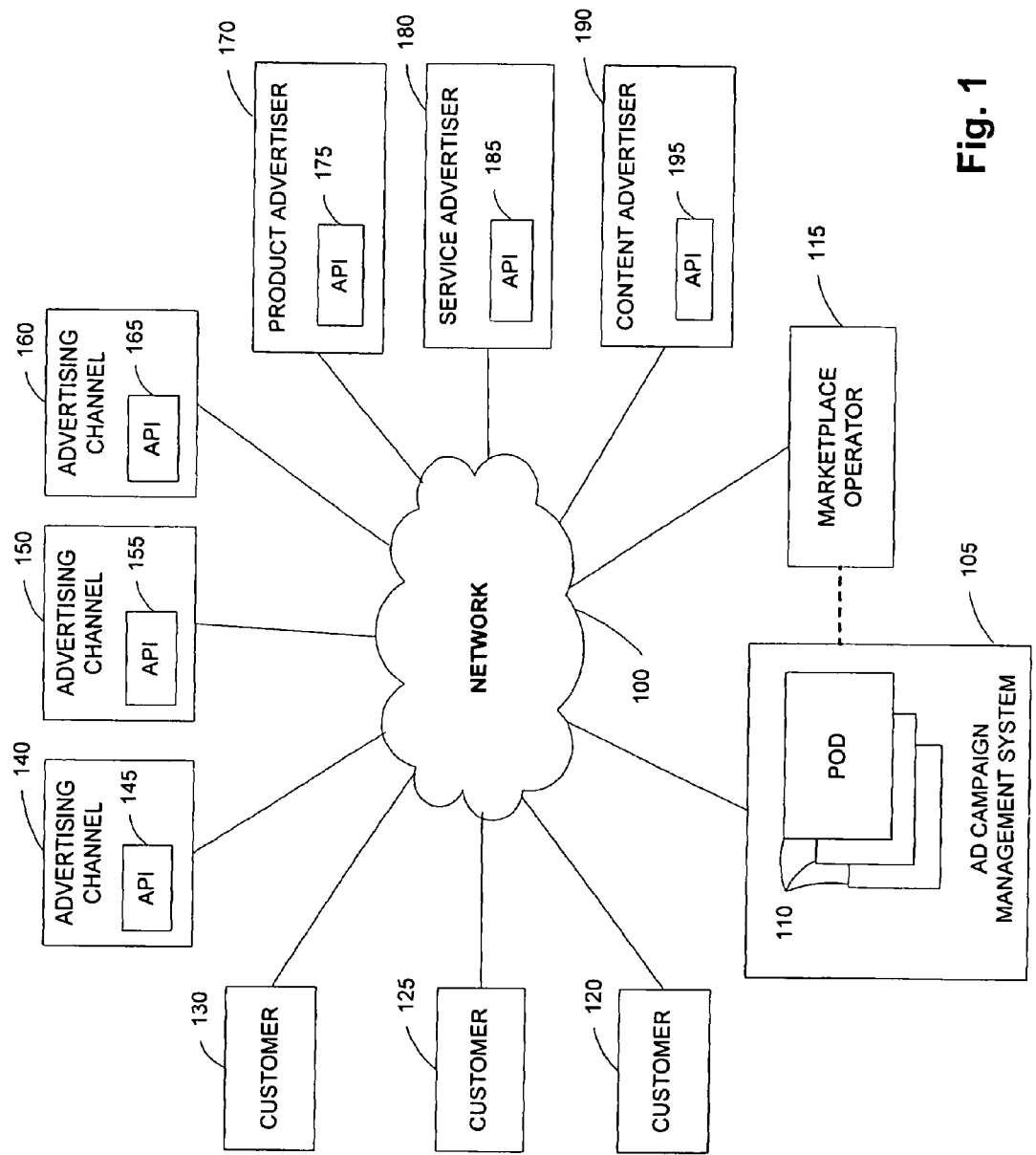
FIG. 1 is a block diagram of a marketplace for the purchase and distribution of advertisements according to one embodiment of the present invention.

FIG. 1 illustrates a network configuration in which a system for management of advertisement campaigns 105 of the present invention may operate. As depicted, a network 100, which in one embodiment of the invention may comprise one or more local and wide area networks, such as the Internet, connects customers 120, 125, 130, advertisers 170, 180, 190, various advertising channels 140, 150, 160, a marketplace operators 115, and an ad campaign management system 105, which in one embodiment may comprise a plurality of pods 110. As depicted in FIG. 1, the ad campaign management system 105 may be implemented and function as an independent system. Alternatively, the ad campaign management system 105, or various components thereof, may be implemented as a part of the marketplace operator 115. Communication between the advertising channels 140, 150, 160, advertisers 170, 180, 190, and marketplace operator 115 may be facilitated using APIs 145, 155, 165, 175, 185 and 195.

In general, the ad campaign management system 105 includes one or more tools for facilitating planning, management, optimization, delivery, communication, and implementation of advertisements ("ads") or ad campaigns distributed through advertising channels 140, 150, 160. Advertising channels 140, 150, 160 may include particular entities, organizations, or the like, that facilitate distribution of ads for advertised products, services and content of advertisers 170, 180, 190. Advertisers 170, 180, 190 may include entities, individuals, companies, organizations, etc. that arrange for advertisement of their products, services, or content to be presented through advertising channels 140, 150, 160 to customers 100,125,130, such as a sponsored listing appearing in a set of search results obtained from a search engine. Customers 120, 125, 130 may include users of, or audiences exposed to, resources, media, outlets, search engines, websites, etc. to whom advertisements of the advertisers 170, 180, 190 are presented through the advertising channels 140, 150, 160.

The marketplace operator 115 provides a virtual marketplace (or a set of virtual marketplaces), in which advertisers 170, 180, 190 may bid for search terms or groups of terms, which, when used in a search by the customers 120, 125, 130 in the advertising channels 140, 150, 160, cause display of their advertisement listings or links among the display results. Also, the advertisers 170, 180, 190 may bid for position or prominence of their listings in a set of search results. In addition, the marketplace operator 115 may provide content match and sponsored search auctions, incoming banner ad auctions to the advertisers 170, 180, 190. The marketplace operator 115 may further include an offer exchange used to facilitate arrangements between the advertising channels 140, 150, 160 and advertisers 170, 180, 190 relating to ads, including suggesting and matching corresponding advertising channels 140, 150, 160 and advertiser offers.

In one embodiment of the invention, the ad campaign management system 105 is operative to facilitate placement of the advertiser's search term bids with search-term auctions hosted by marketplace operators 115. Some marketplace auctions are stable, while others have scores of advertisers constantly jockeying for position, getting into bidding wars, etc. Some advertisers change their bids infrequently, while others change their bids as often as possible. Since the marketplace auctions in each marketplace are updated continuously and frequently, the ad campaign management system 105 allows advertisers 170, 180, 190 that have listings authorized to participate in these auctions to make arbitrary and frequent changes to their bids, as well as bring the listing online and offline. When advertising channels 140, 150, 160 request advertisement listings, the current or most updated state of the auction determines the listings that will be served to the advertising channels 140, 150, 160. Thus, when an advertiser changes the bid associated with a given listing, the ad campaign management system 105 is operative to provide in real time the updated bids to the virtual search term auctions hosted by the marketplace operators 115.

More detail regarding the aspects of auction-based systems, as well as the structure, function and operation of the marketplace operator, as mentioned above, can be found in commonly owned U.S. patent application Ser. No. 10/625,082, filed on Jul. 22, 2003, entitled, "TERM-BASED CONCEPT MARKET"; U.S. patent application Ser. No. 10/625,000, file on Jul. 22, 2003, entitled, "CONCEPT VALUATION IN A TERM-BASED CONCEPT MARKET" filed on Jul. 22, 2003; and U.S. patent application Ser. No. 10/625,001, filed on Jul. 22, 2003, entitled, "TERM-BASED CONCEPT INSTRUMENTS", all of which are hereby incorporated herein by reference in their entirety. In some embodiments, systems and methods associated with ad campaign management according to the present invention may be practiced in combination with methods and systems described in the above-identified patent applications incorporated by reference.

The ad campaign management system 105 may broadly represent all program code, software tools, applications, application program interfaces (API), or other tools used in implementing systems and methods according to embodiments of the present invention, including systems and methods associated with the structure, management and optimization of ad campaigns. Although the ad campaign management system 105 is being depicted in FIG. 1 as being separate from the marketplace operator 115, in some embodiments, components of the ad management system 105 may be located elsewhere, such as at computers associated with advertising channels or advertisers, in order to facilitate communication between these entities. Furthermore, the ad campaign management system 105 may be organized according to one or more pods, which may be distributed in different locations around the world to operate in conjunction with geographically dispersed customers, advertisers, advertising channels, and marketplace operators.

While the ad campaign management system 105 may be used in facilitating arrangements relating to presentation of advertisements, it is to be noted that in some embodiments, the ad campaign management system 105 does not arrange or assist in arranging presentation of advertisements. For example, in some embodiments, the ad campaign management system 105 may be used in facilitating management or optimization of ad campaigns, or automatically facilitating the management or optimization of ad campaigns, without actually arranging for presentation of advertisements, a task that may be performed by the advertising channels 140, 150, and 160.

Through the advertising channels 140, 150, and 160 (e.g., outlets, media, companies, blogs, search engines, Internet portals, etc.) advertisements may be presented. For example, off-line advertising channels may include entities through or in connection with which various kinds of off-line ads may be presented, such as television stations, radio stations, newspapers or newspaper organizations, magazines or magazine organizations, etc. On-line advertising channels may include entities through or in connection with which Internet-based or Internet-accessible advertisements may be presented, such as search engines (e.g., Yahoo.com, Google.com, etc.), e-commerce sites (e.g., Amazon.com, Ebay.com, etc.), or other websites such as news or content providing websites (e.g., MSN.com, Nytimes.com).

As shown in FIG. 1, the advertising channels 140, 150, 160 may be disparate from each other in terms of the manner of ad presentation or ad presentation medium they control and may utilize different platforms, programs, applications, hardware, software, or data storage techniques with respect to information collection, storage, or communication. They may also be different in terms of any data or combinations of data they collect and store regarding ads, ad campaign performance, or audiences of the ads, such as customers 120, 125, 130. To that end, the ad campaign management system 105 may need to employ different programming techniques or applications in order to process, re-format or translate the stored advertisements in a format suitable for presentation through a given advertising channel. Likewise, ad campaign performance information received from disparate advertising channels 140, 150, 160 and advertisers 170, 180, 190 may need to be processed differently, re-formatted or translated before being stored in the pods 110. To facilitate communication with the ad campaign management system 105, advertising channels 140, 150, 160 and advertisers 170, 180, 190 may utilize custom APIs 145, 155, 165 and 175, 185, 195, respectively.

In one embodiment of the present invention, the ad campaign management 105 system may be operative to obtain, collect, utilize, or facilitate utilization of, data from numerous advertising channels and advertisers. Data obtained by the advertising channels 140, 150, 160 and advertisers 170, 180, 190 may be useful in managing or optimizing advertiser campaigns. For example, ad campaign performance data or user information may be obtained by the advertisers 170, 180, 190 or advertising channels 140, 150, 160 through tracking of the customers' visits to the advertisers' websites or an outlet, portal, or media provided by the advertising channels 140, 150, 160. Such data provides a rich source of information that may be used, analyzed, or mined to determine likely future performance of ads in various contexts, to various users, at various times, etc.

Data sent from the advertising channels 140, 150, 160 and advertiser websites to the ad campaign management system 105 may be stored in one or more pods 110 for further processing and analysis. Such data may include, for example, ad campaign performance information, such as statistics or metrics indicating or suggesting performance or success of an ad, a channel (or an ad or ads presented through a channel, etc.), a tactic, a campaign, multiple campaigns, component or aspect of a campaign, etc. For example, ad campaign performance information may include information about how frequently a sponsored listing result retrieved through the given advertising channel 140, 150, 160 gets presented, selected, or results in customer visits to a linked advertiser website 170, 180, 190 and how many of those visits result in the customer making a purchases on the advertiser website 170, 180, 190. Additionally, the collected data may include the number raw clicks on the ads presented through the advertising channels 140, 150, 160.

In another example, ad campaign performance information collected from the advertising channels 140, 150, 160 may include one or more metrics that provide an indication of value per lead, which indicates how many or what proportion of clicks on a sponsored link actually result in a return of any sort to the advertisers 170, 180, 190. Such return depends on the particular advertiser and the advertiser's business objectives. If the advertiser is attempting to sell products, services, or content, for example, return includes purchases at the advertiser's website resulting from or attributable to leads ("conversions"). Return is not limited to sales, however, and may be anything of value to the advertiser that is gained from the conduct or action of a lead-attributable visitor on the advertiser's website.

Tracking and collection of ad performance information can be accomplished using, for example, HTML tagging of advertiser websites, as described further below with reference to FIG. 8. Additional ad performance data may be provided to the ad campaign management system 105 directly by the advertising channels 140, 150, 160. Additional description of customer information and its uses can be found in U.S. Patent Application No. 60/592,799, filed on Jul. 30, 2004, entitled, "METHODS AND SYSTEMS FOR USE IN A COMPUTERIZED SEARCH-BASED ADVERTISING MARKET"; U.S. Patent Application No. 60/546,699, filed on Feb. 20, 2004, entitled, "COMPUTERIZED ADVERTISING OFFER EXCHANGE"; and U.S. patent application Ser. No. 10/783,383, filed on Feb. 20, 2004, entitled, "COMPUTERIZED ADVERTISING OFFER EXCHANGE", all of which are hereby incorporated herein by reference in their entirety.

Figure 2:
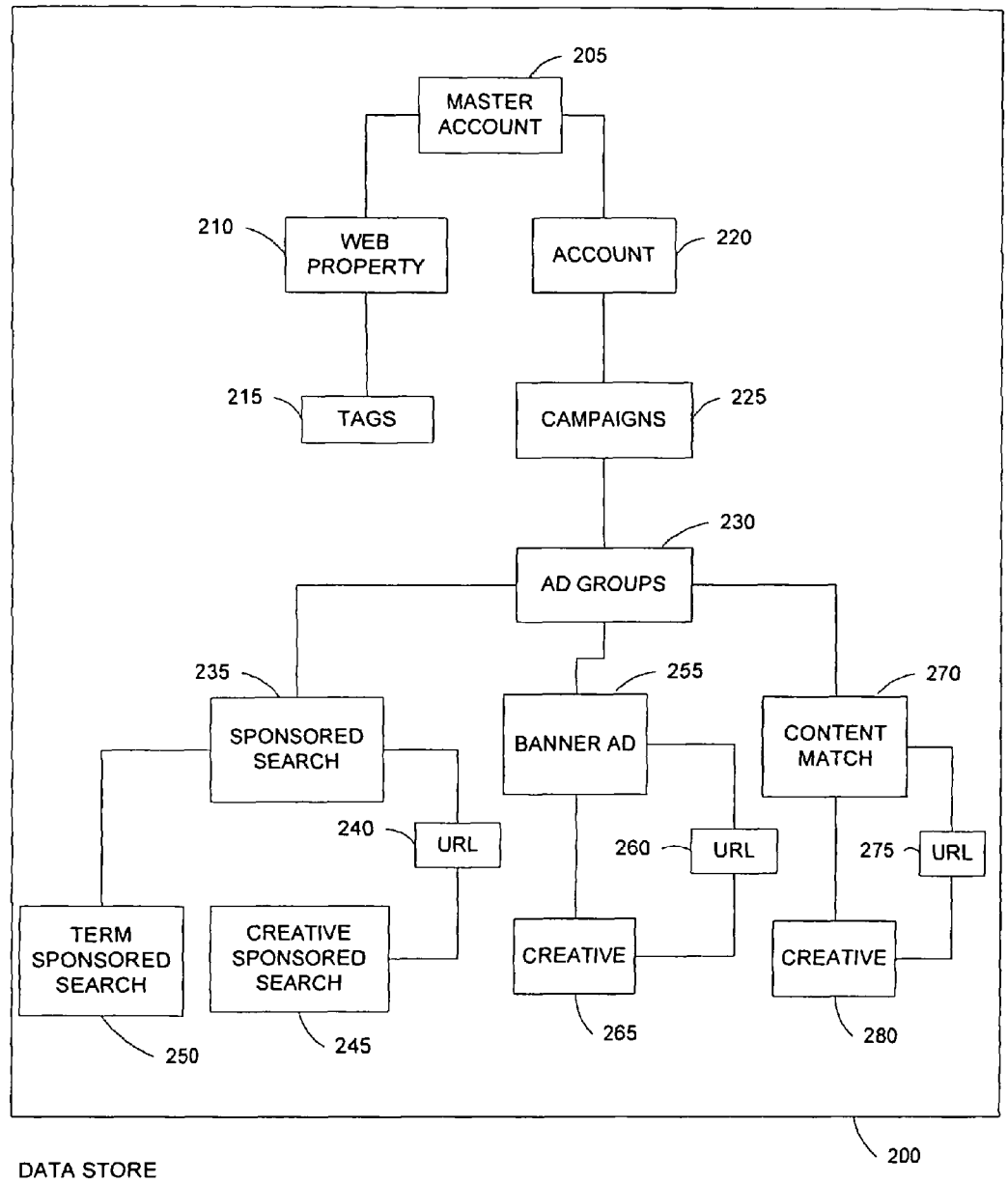
FIG. 2 is a block diagram of an advertisement campaign data structure according to one embodiment of the present invention.

FIG. 2 illustrates a data structure for organizing and maintaining user account data in the ad campaign management system according to one embodiment of the present invention. To maintain user account data, the ad campaign management system may provide one or more pods in one embodiment of the present invention. A pod may comprise a data store 200 for maintaining user account data as well as a plurality of tools for facilitating planning, management, optimization, delivery, communication, and implementation of advertisements and ad campaigns, which will be discussed in detail at FIG. 7.

In one embodiment, the data store 200 facilitates hierarchical storage of ad campaign data providing advertisers with multiple levels of structure for control of their advertisement content. In one embodiment, the data store 200 may maintain a plurality of user accounts for managing advertisement content associated with one or more advertised Web properties. For example, an advertiser utilizing services of the ad campaign management system may be provided with a master account 205 for managing one or more advertised Web properties 210. A Web property 210 may include a website, or a combination of related websites and pages for which the advertiser is advertising. Furthermore, the master account 205 may be partitioned into several accounts 220 (as described in more detail below) for separately managing each advertised Web property 210.

To facilitate tracking and collection of ad performance data from the Web properties 210, the data store 200 may further maintain custom tags, program code, navigation code, etc. 215. According to one embodiment, a tag 215 may comprise a piece of code that is created by the system and placed on relevant webpages of a given website to allow automatic tracking and collection of data indicative of customer session on the advertiser website. For example, a tag may be used to track user visits to, interaction with, or purchases from a website to which a user navigates as a result of clicking on advertisement link associated with the website. Depending on specific needs and business objective of a given advertiser, tags may be coded to collect specific information regarding the customer session that is of interest to the advertiser. Thus, some tags may enable collection of data regarding the number of raw clicks on the advertiser website, while others tags may track numbers of clicks that resulted in conversions, e.g., purchase of a product or service from the advertiser website. Those of skill in the art recognize that data collection may be limited to other portions of the customer session.

Some embodiments of the invention utilize or may be combined with features or technologies, such as, for example, HTML tagging, data tracking, and related technologies, as described in U.S. patent application Ser. No. 09/832,434, filed on Apr. 10, 2001, entitled, "SYSTEM AND METHOD FOR MONITORING THE INTERACTION OF RANDOMLY SELECTED USERS WITH A WEB DOMAIN"; and U.S. patent application Ser. No. 09/587,236, filed on Jun. 2, 2000, entitled, "SYSTEM AND METHOD FOR MONITORING USER INTERACTION WITH WEBPAGES", both of which are incorporated herein by reference in their entirety.

In one embodiment of the present invention, within a master account 205, an advertiser may maintain one or more accounts 220, which may be used to manage ad campaign spendings associated with individual Web properties 210. Thus, accounts 220 allow advertisers to distribute their advertising funding between different Web properties 210 and between separate ad campaigns 225. A given ad campaign 225 may include a set of one or more advertising activities or conduct directed to accomplishing a common advertising goal, such as the marketing or sales of a particular product, service, or content, or group of products, services or content. Two ad campaigns may be considered disparate when the ad campaigns are directed to different advertising goals. For example, an advertiser may wish to advertise a product for sale and a service associated with this product. Thus, the advertiser may store separate ad campaigns 225 for advertising the product and the service.

In one embodiment of the invention, storage of an ad campaign 225 may be further subdivided into several ad groups 230. An ad group 230 may comprise a conceptual compartment or container that includes ads and ad parameters for ads that are going to be handled in a similar manner. An ad group 230 may allow for micro-targeting, e.g., grouping ads targeted to a given audience, a demographic group, or a family of products. For example, an ad group may be related to a given manufacturer's products, such as Sony, Microsoft, etc. or a family of high-end electronics, such as TVs, DVDs, etc. There is a number of ways in which a given group of ads may be managed in a similar manner. For example, an advertiser may specify that there be a certain markup (e.g., 50%) on items in a given ad group, may want to distribute all those ads in a certain way, or may want to spend a certain amount of its budget on those advertisements.

In one embodiment, changes made to the parameters of a given ad group 230 may apply to all ads within a given ad group. For example, one such parameter may be pricing. For a sponsored search, an advertiser may set the default price for the whole ad group but may override the price on each individual term. Similarly, an advertiser may further specify that certain terms are low value, but decide to increase the amount spent on another term uniformly across all ads in a given ad group. Thus, storage according to one or more ad groups 230 enables advertisers to bridge the gap between ad campaigns and the individual ads comprising a given ad campaign.

A given ad may contain one or more items of advertising content that are used to create ads/terms in an ad group, including, but not limited to, creatives (e.g., titles, descriptions) and destination URLs (plus associated URL tracking codes). Optionally, a given ad may contain a {KEYWORD} token for substitution in the title, description, or other ad component. Furthermore, ads may exist as a template in an ad library (not pictured) that can be reused across ad groups or a local ad that is used and stored only within a specific ad group. The ad library, which may be provided by the ad campaign management system, allows advertisers to store ad templates, sharing and reusing them across campaigns and ad groups. Ads in the ad library may be shared within an account, e.g., each account has its own library.

An ad group 230 may utilize numerous tactics for achieving advertising goals. The term "tactic" refers to a given form or type of advertising. For example, in on-line advertising, tactics may include sponsored search result listings 235, banner advertisements 245, content match 270, etc. In off-line advertising, tactics may include television commercials, radio commercials, newspaper advertisements, etc. In different embodiments, tactics may include subsets or supersets of the listed examples or other examples. For instance, on-line advertising is an example of a broader tactic that includes the narrower tactic of sponsored search result listings. Furthermore, the advertiser may utilize multiple advertising channels for different tactics. For example, the advertiser may utilize sponsored search listings in several websites or portals, such as Yahoo.com, Google.com, MSN.com, etc.

One example of an advertising tactic is sponsored search 235. According to one embodiment of the present invention, sponsored search 235 operates within the context of an auction-based system or marketplace that is used by advertisers to bid for search terms or groups of terms. When the terms are used in a search, the given advertiser's ad listings or links are displayed among the search results. Advertisers may further bid for position or prominence of their listings in the search results. With regard to auction-based sponsored search 235, a given advertiser may provide a uniform resource locator (URL) 240 for the webpage to which the ad should take the customer if clicked on, as well as the text or creative of the advertisement 245 that should be displayed in connection with the URL 240. An advertiser may identify one or more terms 250 that should be associated with the advertisement 245.

Another example of advertising tactic is content match 270. Content match advertisements 280 may be used by the advertiser to complement, or as alternative to, the sponsored search tactic 235. Ads stored according to the content match tactic 270 are displayed alongside relevant articles, product reviews, etc, presented to the customers as result of a search. For the content match tactic 270, data store 200 stores one or more URLs 275 identifying the address of a webpage where a given ad should take the customer if clicked on, as well as the text, image, video or other type of multimedia comprising the creative portion of the advertisement 280 that should be displayed next to the URL 275.

Yet another example of an advertising tactic is banner ad 255. Banner ad tactic 255 may be used by the advertiser to complement, or as alternative to, the sponsored search tactic 235 and content match tactic 270. In contrast to the sponsored search tactic and content match tactic, which are usually based on a pay-per-click payment scheme, an advertiser pays for every display of the banner ad 265, referred to as an impression. Alternatively, if the banner ad displays a phone number, an advertiser may only be billed when a user calls the phone number associated with the advertisement ("pay-per-call"). Thus, for the banner ad tactic, the data store 200 maintains a URL 260 to the webpage where the ad should take the customer if clicked on, as well as the creative or the given banner ad 265.

The data store 200 of the ad campaign management system may further store various parameters for each ad group. Such parameters may include, for example, maximum or minimum bids or bidding positions (rankings or prominence of listings) associated with a term or term cluster for the particular ad group or ads within a given ad group. As described above, in embodiments of an auction-based sponsored search result listings environment, prominence or rank of listings is closely related to ad performance, and therefore a useful parameter in ad campaign management. The rank of a given ad determines the quality of the placement of the ad on pages that are displayed to customers. Although details vary by advertising channel, top-ranked listings typically appear at the top of a page, the next listings appear in the right rail and additional listings appear at the bottom of the page. Listings ranked below the top five or so will appear on subsequent search results pages.

There is a correlation between rank and both number of impressions and click-through rate (clicks per impression), which provides an opportunity for advertisers to pay more per click (get a higher rank) in order to get more visitors to their web site. The result is that an advertiser may determine how much they are willing to bid for each listing based on the advertiser's business objectives and the amount of traffic on the advertised website that the listing generates. This information may also be stored in the ad campaign management system according to one embodiment of the present invention.

Figure 3:
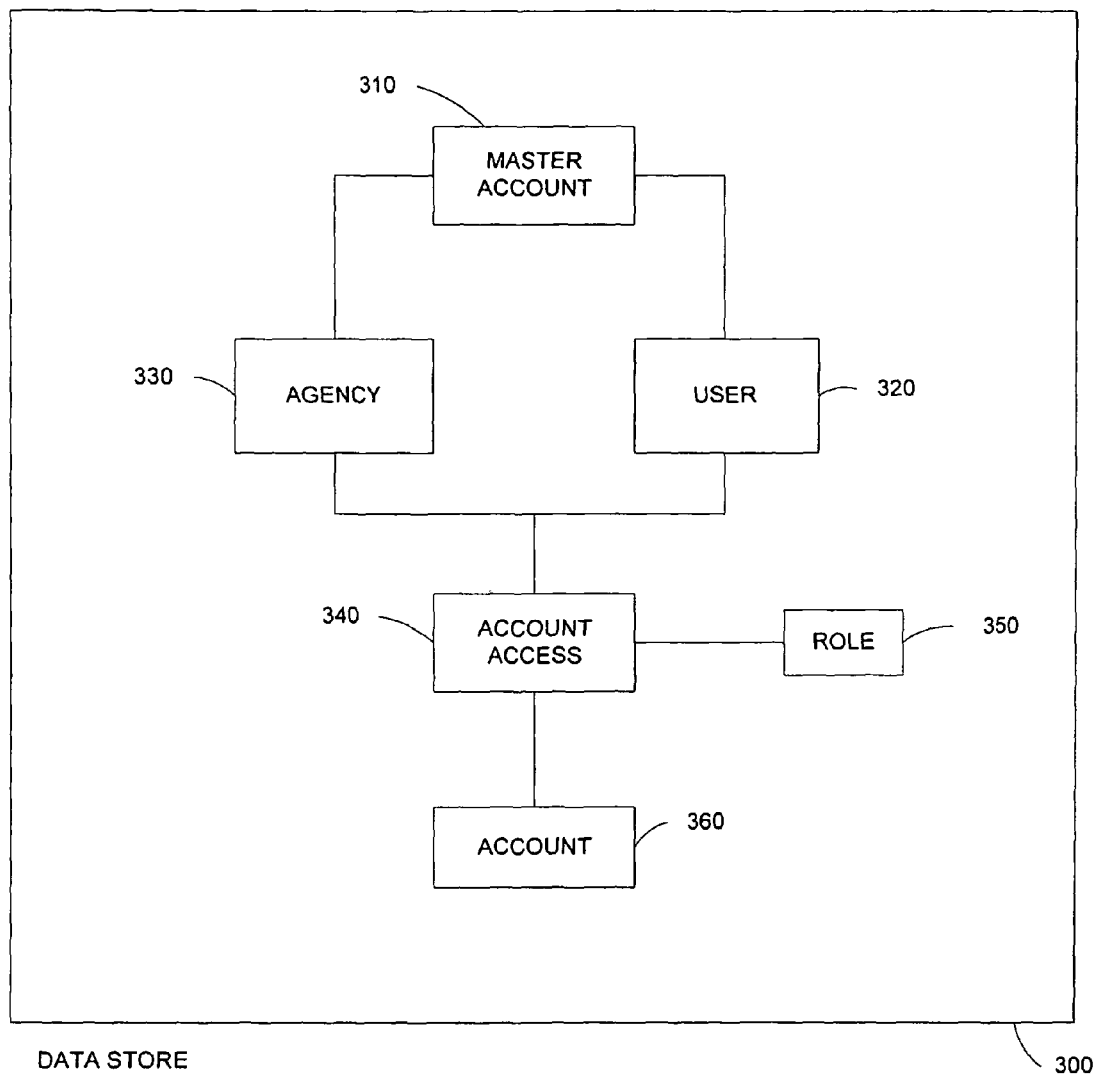
FIG. 3 is a block diagram illustrating an account access data structure according to one embodiment of the present invention.

FIG. 3 illustrates one embodiment of the account access data structure 300 of the ad campaign management system. As described above, advertisers that utilize services of the ad campaign management system are provided with a master account 310 for managing their Web properties, which may include one or more websites. Managing of Web properties or ad campaigns may include any of a variety of activities relating to overseeing, making, implementing or conducting decisions regarding one or more ad campaigns, or aspects thereof. An advertiser, however, may delegate design or management of one or more of its accounts to an agency 300, which may specialize in such services.

In the event an advertiser delegated management of one or more of its accounts to one or more agencies 300, the data store 300 may identify one or more agencies 300 having access to the account(s) 360 associated with the master account 310. In another embodiment, if an agency manages master account 310 for several Web properties of several advertisers, agency may limit advertiser access to only his account. Thus the data store 300 may create a data structure for storing lists of all users 320 having access to the account(s) 360. (Hereinafter, advertisers and/or agencies utilizing services of the ad campaign management system may be referred to as users of the ad campaign management system.) Furthermore, either one of the master account controlling entities may specify type and degree of access to the accounts 360 available to the non-controlling parties. For example, advertiser may limit agency's accesses to particular business areas of the account 360, or specify how much agency can spend, what areas they can see, modify, etc. Access information may be stored in the account access data structure 340 and associate with one or more accounts 360.

To facilitate account access functionality of the ad campaign management system, the account access data structure 340 may be associated with a role data structure 350. Each role 350 has different levels of permissive actions. For example, some roles may allow copying of account data, some roles may allow reading only, yet other roles may allow to update account data, etc. In one embodiment of the invention, the agency 330 may control access to the accounts 360 or master accounts 310. The agency 330 may then delegate through an access table (not shown in FIG. 3) access to the account to additional users. Using the access table 340, the agency 330 can defer to other organizations or individuals, such as a freelancer, control over some parameters of the advertising campaign. Thus, through the use of roles 350 and access tables, levels of permissive actions and access to the accounts 360 may be specified and maintained in the data store 300.

Figure 4:
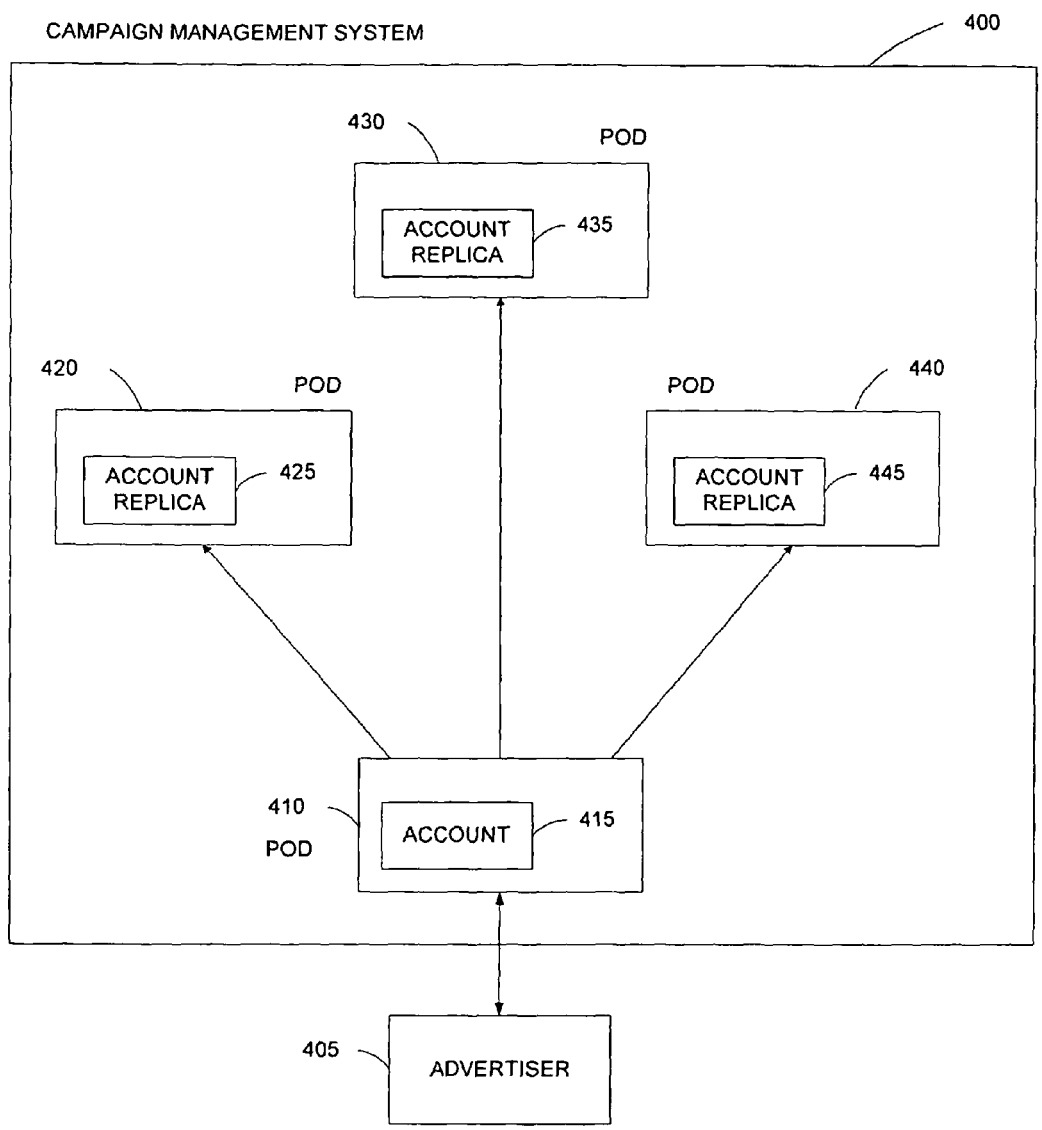
FIG. 4 is a block diagram illustrating an ad campaign management system according to one exemplary embodiment of the present invention.

FIG. 4 illustrates an exemplary ad campaign management system according to one embodiment of the present invention. The ad campaign management system 400 comprises a plurality of pods 410, 430, 430, 440 that maintain one or more user accounts 415, 425, 435, 440 and contain advertisement content associated with one or more advertised Web properties. In addition, a pod provides to the advertisers 405 a plurality of tools for facilitating planning, management, optimization, delivery, communication, and implementation of advertisements, as is described in greater detail below with reference to FIG. 7. While only four pods are shown in FIG. 4, it is to be understood that fewer or additional pods may be present in accordance with various embodiments of the ad campaign management system 400.

The pods 410, 420, 430, 440 may be located in different geographic locations to provide services of the ad campaign management system 400 to users located in various geographic markets. For example, the ad campaign management system 400 may maintain one pod on each continent with a pod placed on each coast of the United States. In another embodiment, several pods may be located on each continent depending upon, for example, the number of system users, e.g. advertisers, maintaining their advertisement accounts on a given pod. Thus, for example, if the capacity of a given pod has reached its maximum limit, e.g., 10,000 user accounts, one or more pods may be added to the ad campaign management system 400 in the given region of the world for serving new users. The use of multiple pods improves system scalability in that that more pods may be added to the ad campaign management system 400 at any time to expand its geographic coverage and to alleviate load on the existing pod infrastructure in a particular region. Scalability of the pod architecture and ad campaign management system 400 provides improved system efficiency and performance.

The ad campaign management system 400 is operative to create and maintain user account data on a pod located closest to the user according to one embodiment of the present invention. Thus, for example, if an advertiser 405 is located or most frequently accesses his or her ad campaign management account from New York and the system maintains two pods in the continental U.S. (a pod 410 on the east coast and a pod 420 on the west coast), the user account may be created and maintained on the east coast pod 410. In this manner, the user account data including advertisement content as well as various tools provided by the ad campaign management system 400 for management of user advertisements and ad campaigns may be located geographically close to the user. Such configuration decreases network latency associated with the access of an advertisement account maintained on the pod 410.

According to one embodiment, the ad campaign management system 400 may replicate a portion of the user account data across several pods located in different geographic regions. For example, a portion of the user account 415 may be replicated in additional pods 420, 430, 440 as account replicas 425, 435, 445. In one embodiment, only account information, e.g., account identifiers, account access lists, data collection scripts, or the like, may be replicated across the pods 420, 430, 440 but not the actual advertisement content, e.g., advertisements, advertisement and campaign budgets, search term bids, etc. Thus, every pod on the system has information about every user account maintained by the ad campaign management system 400. Alternatively, all account data associated with one or more ad campaigns run in a given geographic market may be replicated across several pods located in given regions of the world. Such configuration provides necessary account data closer to a given local advertiser.

The replicated account information may be used by the ad campaign management system 400 in several ways. In one embodiment of the present invention, if the advertiser 405 attempts to access the ad campaign management system 400 from a region where the pod 440 is located, the system may use the user account information 445 stored in the pod 440, to authenticate and redirect the advertiser 405 to the pod 410 where the bulk of the user data is maintained in the account 415. In another embodiment, the replicated account information stored in the pods 420, 430, 440 may be used to identify the collected ad performance data, e.g., visitor state data, advertising channel data, etc., as belonging to the given account 415, such that the collected performance data may be sent by the pods 420, 430, 440 to the pod 410 for storage.

The ad campaign management system 400 may provide advertisers 405 with a uniform set of graphical interfaces (GUI) regardless of the location from where the system is being accessed by the advertisers 405. In one embodiment, the ad campaign management system 400 may host a website or provide a web application for enabling advertisers 405 to access their ad accounts maintained on the pods 410, 420, 430, 440. In another embodiment, the ad campaign management system 400 may expose one or more APIs, such as XML-based APIs, such that advertisers 405 may design a custom user interactive interface to allow access to their accounts on the pods 410, 420, 430, 440 of the ad campaign management system 400.

Figure 5:
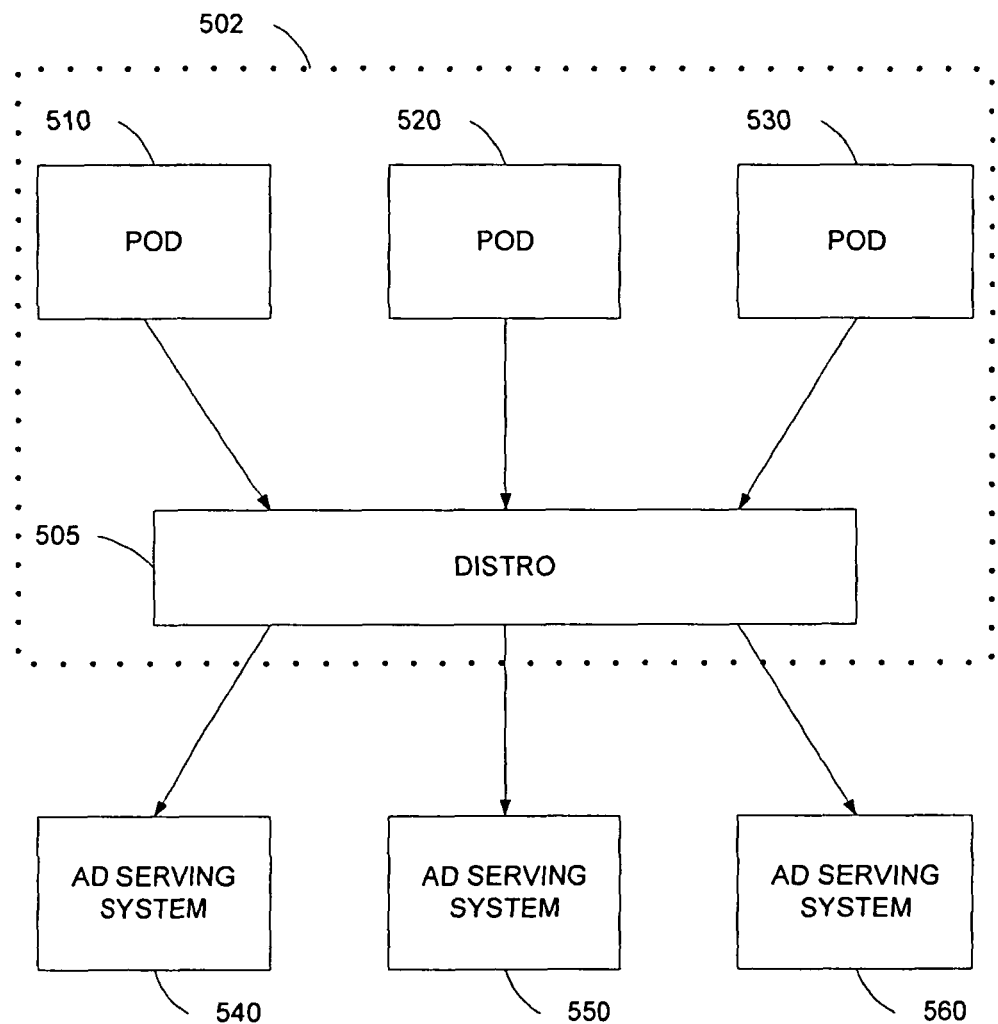
FIG. 5 is a block diagram illustrating an exemplary system for distribution of advertisement content according to one embodiment of the present invention.

FIG. 5 illustrates an exemplary system for distribution of advertisement content provided by the ad campaign management system 502 according to one embodiment of the present invention. The ad distribution system 502 comprises a distribution component 505 ("distro") operative to collect advertisement content or changes thereto from the pods 510, 520, 530 and to distribute the collected advertisements to geographically distributed ad serving systems 540, 550, 560. Distro 505 is operative to determine which ad servicing system 540, 550, 560 needs to receive the updated advertisement listings. For example, the distro component 505 may need to update only U.S.-based ad serving system 540 if the ad campaign data indicates that the given ad listings are to be run in the U.S. market only. Alternatively, the distro 505 may need to update both U.S.-based and European ad serving systems 540 and 550, respectively, if the ad campaign data indicates that the given ad listings are to be run in the U.S. and European markets.

The ad serving systems 540, 550, 560, which are placed in disparate geographic markets, are operative to serve the advertisement content received from the distro 505 to the various advertising channels. In contrast to the pods 510, 520, 530, which are placed in the proximity to the advertisers, the ad serving systems 540, 550, 560 may be located in proximity to the advertising channels. Such configuration minimizes network latency associated with the retrieval and presentation of the advertisement content to the potential customers.

Figure 6:
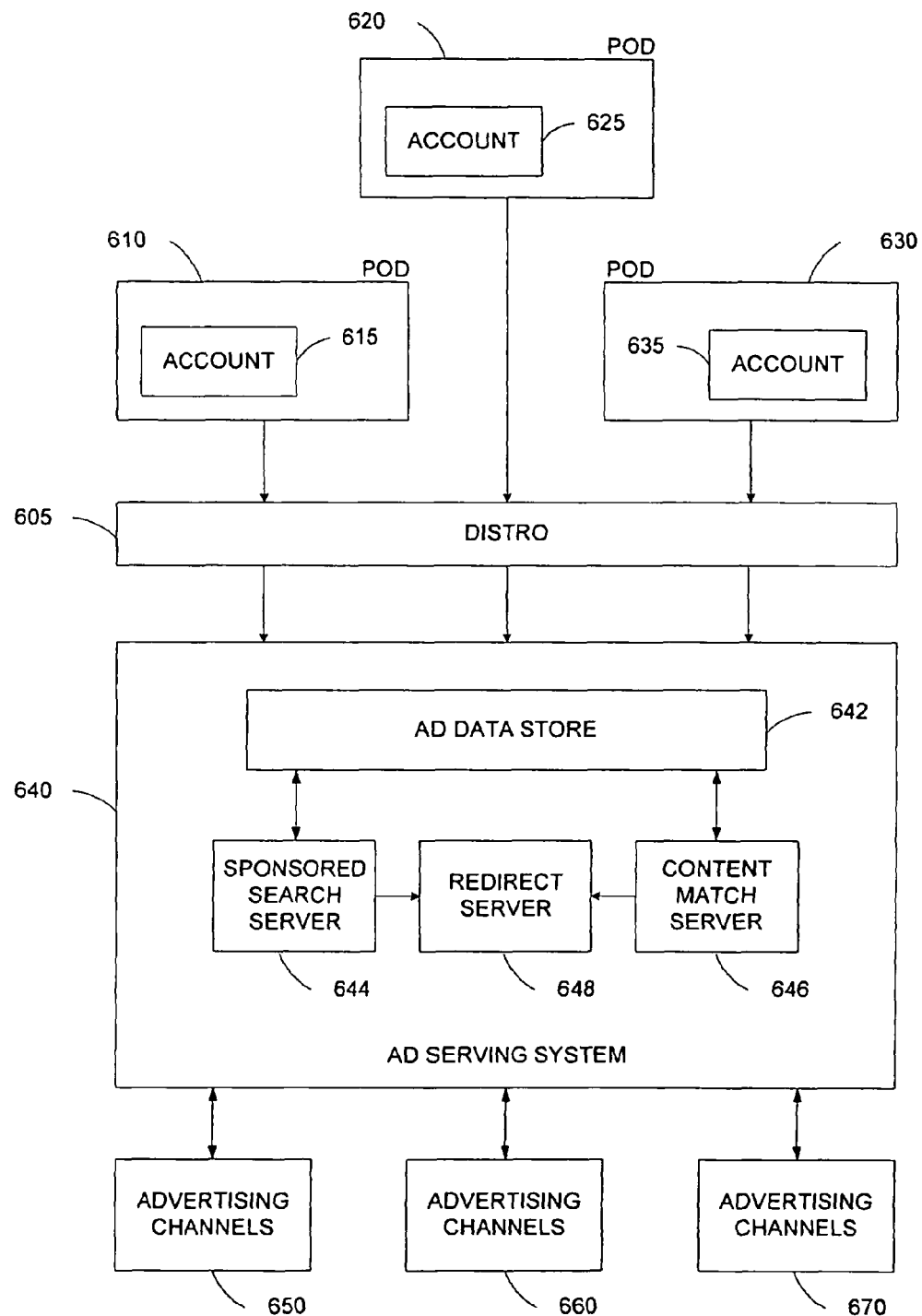
FIG. 6 is a block diagram illustrating an advertisement serving system according to one embodiment of the present invention.

FIG. 6 illustrates an advertisement serving system according to one embodiment of the present invention. The ad serving system 640 may comprise an ad data store 642, sponsored search server 644, a content match server 646 and a redirect server 648. In one embodiment of the present invention, the ad data store 642 is operative to store all advertisement listings received from the distro 605 for a given geographic market. In one embodiment, the ad data store 642 may comprise one or more relational databases or other data stores that may be managed using various known database management techniques, such as, for example, SQL and object-based techniques. In one embodiment, the ad data store 642 may be implemented using one or more of the magnetic, optical, solid state or tape drives.

The sponsored search server 644 is operative to process sponsored search listing requests from the advertising channels 650, 660, 670. When a request for a sponsored search listing comes from the advertising channels 650, 660, 670, the sponsored search server 644 queries the ad data store 642 for any advertisements matching the specified search terms. If matching ad listings are available in the data store 642, the sponsored search server 644 returns the retrieved advertisements to the advertising channels 650, 660, 670. The advertising channels 650, 660, 670 then display the received sponsored advertisements, which may include the display in descending order based on the bid value for the given search terms whereby matching ads with the highest bids are displayed first followed by the lower bid advertisements.

The content match server 646 operates in a similar manner in one embodiment of the present invention. The content match server 646 is operative to process content match listing requests from the advertising channels 650, 660, 670. When a request for a content match listing comes from the advertising channels 650, 660, 670, the sponsored search server 646 queries the ad data store 642 for advertisements matching the specified search terms. If matching ad listings are available in the data store 642, the content match server 646 returns the retrieved advertisements to the advertising channels 650, 660, 670. The advertising channels 650, 660, 670 then display the received advertisements in the order based on the relevancy to the received advertisements to the search terms.

According to one embodiment of the present invention, when a customer clicks on the advertisement provided by the one of the advertising channels 650, 660, 670, the customer browser is directed to the redirect server 648 of the ad serving system 640. The redirect server 648 may log the click event and redirect the customer browser to the URL of the advertised web property specified in the displayed advertisements. The redirect server 648 may determine from the advertisement data a given pod 610, 620 or 630 that has provided the clicked-on advertisement and send a message to the given pod indicating the click event, which may be stored in the given pod 610, 620 or 630 for ad performance evaluation purposes. The given pod 610, 620 or 630 may then implement a data collection procedure, which is described in greater detail herein with reference to FIGS. 7 and 8.

Figure 7:
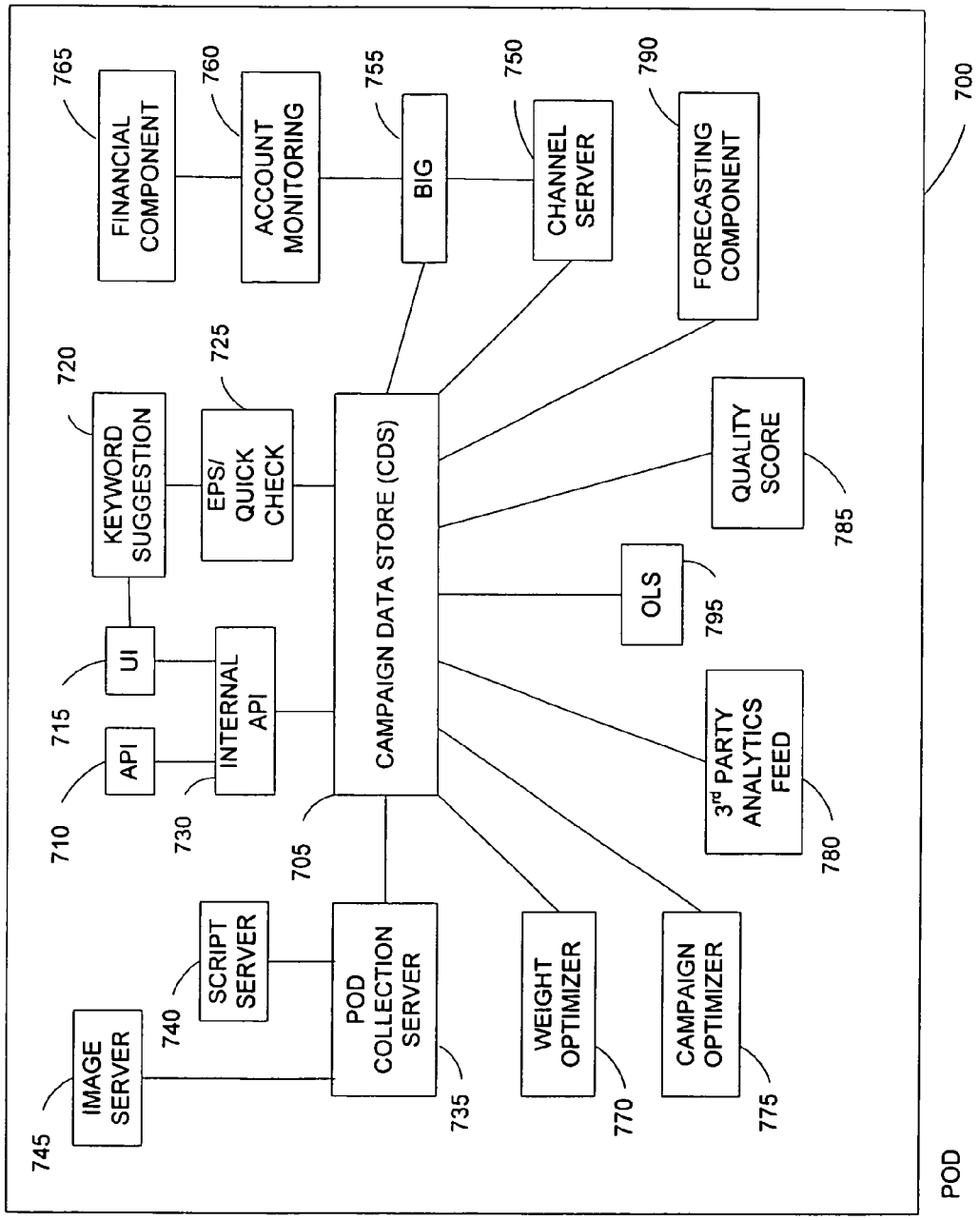
FIG. 7 is a block diagram presenting a pod according to one embodiment of the present invention.

FIG. 7 illustrates one embodiment of the architecture of a pod according to the ad campaign management system of the present invention. The pod 700 comprises a plurality of software components and data stores for facilitating the planning, management, optimization, delivery, communication, and implementation of advertisements and ad campaigns, as well as for storing and managing user accounts. In one embodiment of the invention, a pod 700 comprises a campaign data store ("CDS") 705 for storage of user account information, ad campaigns and ad content. APIs 710 and User Interfaces (UI) 715 are used for reading data from and writing data to the campaign data store 705; internal APIs 730 provide shared code and functions between the API and UI, as well as facilitate interface with the campaign data store 705. A keyword suggestion component 720 may assist users in searching for available search terms, an editorial processing system ("EPS") 725 may be provided to review content of all new ads, and a pod collection server ("PCS") 735 determines a given pod to which the collected ad campaign performance data is to be sent. A script server 740 provides scripts for collection of data indicative of the customer browsing sessions, and an image server 745 receives and processes data indicative of the customer browsing sessions from the customer web browsers.

The pod may further comprise a channel server 750 operative to receive data from one or more advertising channels, a business information group ("BIG") 755 may provide analysis and filtering of raw click data coming from the advertising channels through the channel server 750, and an account-monitoring component 760 may monitor budgets allocated for each ad campaign. A financial component 765 may be provided for planning and budgeting ad campaign expenses, a weight optimizer 770 operative to optimize individual ad performance, and a campaign optimizer 775 may be provided to optimize performance of the ad campaign. The pod 700 may also comprise a third-party analytical feed component 780 for handling incoming ad performance data from third-party sources, and a quality score component 785 to provide metrics for measuring ad performances, and a forecast component 790, which is an analytical tool for predicting keywords trends. Finally, an online sign-up ("OLS") component 785 provides security services for online transactions involving exchange of moneys. Each of the aforementioned components of Pod 700 is described in greater detail herein.

The CDS 705 is the main data store of the pod 700. In one embodiment on the present invention, the CDS 705 stores ad campaign account data including, but not limited to, account access and permission lists, user information, advertisements, data collected from advertiser websites indicative of customer browsing sessions, raw click data received from the advertising channels, third party analytical feeds, ad campaign performance data generated by the system, ad campaign optimization data, including budgets and business rules, etc. In various embodiments of the invention, the CDS 705 stores one or more account data structures illustrated in FIG. 2 and one or more account access data structures illustrated in FIG. 3.

Data in the CDS 705 may be stored and accessed according to various formats, such as a relational format or flat-file format and may be managed using various known database management techniques, such as, for example, SQL-based and Object-based techniques. At the physical level, the CDS 705 may be implemented using combinations of one or more of magnetic, optical, solid state or tape drives. Furthermore, in one embodiment of the invention, CDS 705 may have one or more back up databases that can be used to serve data to the pod 700 during downtime of the CDS 705.

The pod 700 may expose one or more APIs 710 and UIs 715 for utilization by the system users, such as advertisers and agencies, to access services of the ad campaign management system, such as for reading data from and writing data to the CDS 705. The APIs 710 and UIs 715 may be also provided through the distro component, as is explained in greater detail below. The advertisers and their agencies may use the APIs 710, which in one embodiment of the invention may include XML-based APIs, to access the ad campaign management system and data contained therein. In one embodiment, the UI 715 may comprise a website or web application(s) for enabling user access to the ad campaign management system. The pod 700 then also utilizes internal APIs 730, which are shared code and functions between the APIs 710 and UI 715, to facilitate interaction with campaign data store 705.

According to some embodiments, the above described user and application program interfaces may facilitate management and optimization of ad campaigns, which include, but are not limited to, management of listings associated with an auction-based search-term related sponsored search results listings marketplace. For example, advertisers use interfaces 710 and 715 to access the ad campaign information and ad campaign performance information saved in the CDS 705, search the information, analyze the information, obtain reports, summaries, etc. Advertisers may also change listings or bidding strategies using these interfaces, which changes are updated in the CDS 705. Furthermore, the interfaces 710 and 715 may be used to perform comparisons of the performance of components of ad campaigns, such as performance of particular listings, search terms, creatives, channels, tactics, etc. While functionality and use of application program interfaces of the pod is described with reference to an auction-based search term-related sponsored listings context, it is to be understood that, in some embodiments, these interfaces may be used with regard to off-line or non-sponsored search ad campaigns and ad campaign performance, or combinations of on-line and off-line ad campaigns information, as well.

A keyword suggestion component 720 provides keyword suggestions through the interfaces 710 and 715 for assisting users with ad campaign management. In one embodiment of the invention, the keyword suggestion component 720 assists users to search for available search terms. As described above, in an auction-based system or marketplace, advertisers bid for search terms or groups of terms, which, when used in a search by customers, will cause display advertisement listings or links among the search results. The keyword suggestion component 720 provides suggestions to advertisers regarding terms on which they should be bidding. In one embodiment, the keyword suggestion component 720 may analyze at actual searches conducted over a prior time window, e.g., the past month, and provide a suggestion based upon previous searches. In another embodiment, the keyword suggestion component 720 may analyze terms that other advertisers of similar products or services are bidding on and suggest these terms to the advertiser. In yet another embodiment, the keyword suggestion component 720 may determine terms that customers who bought similar products or services use in their searches and suggest these terms to the advertiser. Alternatively, or in conjunction with the foregoing, the keyword suggestion component 720 may maintain a table of terms divided into several categories of products and services and allow advertisers to browse through and pick available terms. The keyword suggestion component 720 may use other techniques for assisting advertisers in the term selection process, such as suggesting a new term to the advertiser if the advertised products and services are unique. Other techniques for keyword suggestion that may be implemented by the keyword suggestion component 720 are described in U.S. patent application Ser. No. 11/295,166, filed on Dec. 6, 2005, entitled "SYSTEMS AND METHODS FOR. MANAGING AND USING MULTIPLE CONCEPT NETWORKS FOR ASSISTED SEARCH PROCESSING" and U.S. Provisional Application No. 60/736,133, filed on Nov. 9, 2005, entitled "MODULAR OPTIMIZED DYNAMIC SETS".

The editorial processing system ("EPS") 725 may ensure relevance of advertisements and mitigates risks to advertisers' listings before a listing can participate in the auction. In general, the EPS 725 reviews new or revised ads. In one embodiment of the invention, the EPS 725 applies a set of business rules that determines accuracy and relevance of the advertiser listings. These rules may be applied automatically by the EPS 725 or through a human editorial review. The EPS 725 may, e.g., through the use of one or more blacklists, detect inappropriate content in the advertiser listings or illegally used trademark terms. In the one embodiment, the EPS 725 responds with annotation such as rejected, approved, rejected but suggested changes, etc.

In one embodiment of the invention, the EPS 725 may comprise a quick check component. Quick check component performs a preliminary or a "quick check" to determine whether to reject an advertisement automatically before it is submitted to a human editor and stored in the campaign data store 705. The API 710 or UI 715 may invoke the quick check component so that advertiser can receive instant feedback. For example, use of prohibited words, such as "best" in the submitted advertisement, may be quickly detected by the quick check component and rejected, obviating the need for human editorial review, which may be determined through the use of one or more blacklists. In contrast, using words such as gambling, adult services, etc., the quick check component might determine that the ad requires a more thorough editorial review. One of the benefits of the quick check component is the rapid provision of feedback to the advertiser, which enables an advertiser to revise the listing right away and thus to expedite review by the human editor.

The pod 700 may also comprise a channel server 750, which is operative to receive and process data received from an advertising channel, such as Yahoo!, Google or MSN. This data may include, but is not limited to, customer profiles, historical customer behavior information, number of raw impressions, click cost, search-term related data, etc. Additional description of customer information and its uses can be found in U.S. Patent Application No. 60/546,699 and Ser. No. 10/783,383, previously incorporated by reference. The channel server 750 may further be operative to reformat the received data into a format supported by the ad campaign management system and to store the reformatted data into the campaign data store 705.

In one embodiment of the present invention, the pod 700 may also comprise a business information group ("BIG") component 755. The BIG 755 is operative to receive cost, click, and impression data that is coming into the pod 700 from various sources including the redirection servers, channel server 750, pod collection server 735 and third-party analytics feeds component 780. In one embodiment of the present invention, the BIG 755 may also perform aggregation and filtering on raw data impressions that are coming into the pod 700, storing the collected and processed data into the campaign data store 705. In other embodiments, the BIG 755 may also perform internal reporting, such as preparing business reports and financial projections according to techniques known to those of skill in the art. To that end, the BIG 755 may communicate with the account-monitoring component 760, which is described in greater detail herein.

In one embodiment of the present invention, the pod 700 may further comprise an account-monitoring component 760 operative to perform budgeting and campaign asset allocation. For example, the account-monitoring component 760 may determine how much money is left in a given advertiser's account and how much may be spent on a particular ad campaign. In one embodiment of the present invention, the account-monitoring component 760 may employ a budgeting functionality to provide efficient campaign asset allocation. For example, an advertiser may set ad campaign budget for a month to a fixed amount, such as $500. The account-monitoring component 760 may implement an ad-bidding scheme that gets actual spending for that month as close to the campaign budget as possible. One example of a bidding scheme employed by the account monitoring component 760 would be to lower the advertiser's bids to reduce how often the advertiser's ads are displayed, thereby decreasing how much the advertiser spends per month, which may be performed dynamically. Another example of budgeting by the account-monitoring component 760 is to throttle the rate at which advertisements are being served (e.g., a fraction of the time it is served) without changing the advertiser's bid (whereas in the previous example the bid was changed, not rate at which advertisements were served). Another example of throttling is to not serve an ad as often as possible but put it out according to a rotation.

A financial component 765 may be provided with the pod 700, which may be an accounting application for planning and budgeting ad campaign expenses. Using the financial component 765 advertisers may specify budgets and allocate campaign assets. The financial component 765 provides an advertiser with the ability to change distribution of campaign budget and to dynamically allocate moneys between different campaigns. The financial component 765 may also present advertisers with information regarding the amount of funds left in a given account and how much may be spend on a particular ad campaign. In some embodiments, the financial component 765 may further be operative to provide advertisers with information regarding profitability, revenue, and expenses of their ad campaigns. The financial component 765 may, for example, be implemented using one or more financial suites from Oracle, SAP, PeopleSoft, or other financial software developers.

In one embodiment of the present invention, pod 700 may further comprise an online sign-up (OLS) component 795. The OLS component 795 may be operative to provide advertisers with a secure online sign-up environment, in which secure information, such as credit card information, can be exchanged using various know encryption techniques. In one embodiment, the OLS component 795 may establish a secure connection between the advertiser computer and the pod 700 using SHTTP, SSL or any other public-key cryptographic techniques known to those of skill in the art.

A quality score component 785 may be provided that is operative to call a quality score for given advertisement. A quality score is one of several ad performance parameters that may be used by the search serving components, such as advertising channels and search engines, to quantify the relative quality of the displayed ads. Thus, a quality score for a given advertisement may be calculated by the ad serving system and fed into the ad campaign management system through the quality score component 785 in accordance with one embodiment of the present invention. In some embodiments, the quality score may be displayed to the advertiser, so that advertiser may revise the ad to improve its quality score. For example, if an advertisement has a high quality score, then the advertiser knows that they should not try to spend money and time trying to perfect it. If an advertisement has low quality score, however, it may be revised to improve its quality score.

In one embodiment of the present invention, the pod 700 may further comprise a forecasting component 790, which is an analytical tool for assisting the advertiser with keyword selection. In some embodiments, the forecasting component may be operative to predict keywords trends, forecast volume of visitor traffic based on the ad's position, as well as estimating bid value for certain ad positions.

The forecasting component 790 may be operative to analyze past performance and to discover search term trends in the historical data. For example, the term "IPOD" did not even exist several years ago, while now it is a very common term in searches. The forecasting component 790 may perform macro-trending, which may include forecasting to determine terms that are popular in a particular region, for example, California, or with particular demographic, such as males. In yet another embodiment, the forecasting component 790 may provide event-related macro- and micro-trending. Such events may include, for example, mother's day, Christmas, etc. To perform event-related trending for terms related to, for example, Mother's Day or Christmas, the forecasting component 790 may look at search patterns on flower-related terms, wrapping paper terms, or other relevant terms. In other embodiments, the forecasting component 790 may analyze the historic data to predict the number of impressions or clicks that may be expected for an ad having a particular rank and may be operative to predict a bid value necessary to place the ad in a particular position.

The pod 700 may also comprise a weight optimizer 770 operative to adjust the weights (relative display frequency) for rotating elements as part of alternative ad ("A/B") functionality that may be provided by the ad campaign management system in some embodiments of the present invention. The A/B testing feature allows an advertiser to specify multiple variants of an attribute of an ad. These elements may include creative (title, description and display URL), destination (landing URL) and perhaps other elements such as promotions and display prices. More specifically, when an end-user performs a search, the ad campaign management system assembles one of the possible variants of the relevant ad and provides it to the advertising channel for display to the end-user. The ad campaign management system may also attach tracking codes associated with the ad, indicating which variant of each attribute of the ad was actually served. The behavior of the end-user then may be observed and the tracking codes may be used to provide feedback on the performance of each variant of each attribute of the ad.

In determining the weight for a particular element, the weight optimizer component 770 may look at actual performance of ads to determine optimal ads for delivery. The weight optimizer component 770 may operate in two modes: Optimize and Static. According to optimize mode, the weight (frequency of display) of each variant changes over time according to measured outcomes associated with each variant. Thus, the weight optimizer component 770 is responsible for changing the weights based on the measured outcomes. The weight optimizer component may also operate according to static mode whereby the weights (frequency of display) of each variant are not changed by the system. This mode may provide the advertiser with data pertaining to measured outcomes. The advertiser also has the option to manually change the weights.

A campaign optimizer component 775 may be provided to facilitate ad campaign optimization to meet specific ad campaign strategies, such as increasing number of conversions from displayed ads while minimizing the cost of the campaign. To that end, according to some embodiments of the present invention, the campaign optimizer component 775 may use data received from the channel server 750, forecasting component 790, third party analytics feed component 790, quality score component 785, and BIG 755 to determine an appropriate amount to bid on given ads, how to allocate the budget across different ads, how to spend money over the entire period of the campaign, etc. Furthermore, campaign optimization not only focuses on executing ads efficiently, but also performing arbitrage between ads across various channels and tactics to determine where the limited ad campaign budget is most effective.

The campaign optimizer component 775 may analyze the obtained analytics data, including ad campaign information, ad campaign performance information, as well as potentially other information, such as user information, to facilitate determining, or to determine, an optimal ad campaign strategy. Herein, an "optimal" ad campaign strategy includes any ad campaign strategy that is determined to be optimal or superior to other strategies, determined to be likely to be optimal, forecasted or anticipated to be optimal or likely to be optimal, etc. In some embodiments, optimizing is performed with respect to parameters, or a combination of parameters, specified by an advertiser, supplied automatically or partially automatically by the ad campaigns facilitation program, or in other ways.

In addition to the foregoing, ad campaign strategy may include any course of action (including, for example, changing or not changing current settings or strategy) or conduct, or aspects or components thereof, relating to an ad campaign. An ad campaign strategy may further include a recommendation regarding a course of action regarding one or more aspects or parameters of an ad campaign, and may include an immediate course of action or set of parameters, or a course of action or set of parameters for a specified window of time. For example, an optimal ad campaign strategy in the context of an auction-based search result listings situation, may include recommendations relating to bidding and bid hiding rates in connection with an auction or marketplace relating to search term or group of terms in connection with sponsored listings.

The campaign optimizer component 775 may be operative to analyze ad campaign performance information to determine an optimal ad campaign strategy. Ad campaign performance information may include a variety if information pertaining to historical performance of an ad campaign, channel, tactic, or ad or group of ads. Ad campaign performance information can include many types of information indicating or providing a suggestion of how effectively ads, or ads presented though a particular channel, etc., influence or are likely to influence user or consumer behavior. For example, an adverting channel, such as Yahoo!, may collect performance information with respect to a particular sponsored search result listing. The information may include a number or percentage of viewers who clicked on the sponsored search result listing, or who shopped at or purchased a product at the advertisers Website as a result of the listing, etc.

The campaign optimizer component 775 may be operative to analyze the ad campaign information to determine an optimal ad campaign strategy. The ad campaign information may include campaign objectives or budget-related conditions or constraints, or can include information specifying, defining, or describing ads themselves, channels, tactics, etc. With regard to auction-based sponsored search result listings, the ad campaign information can include bidding parameters such as maximum or minimum bids or bidding positions (rankings or prominence of listings) associated with a term or term cluster, for instance, as further described below. Such ad campaign information can also include campaign objectives, quotas or goals expressed, for example in metrics such as ROAS (return on ad spend), CPI (clicks per impression), or in other metrics, and with respect to individual ads, terms or term groups, channels, tactics, etc.

The campaign optimizer component 775 may further include bid optimization functionality, which may be used by the system to determine a desirable or optimal bid for a listing, such as a paid search result. The bid optimization functionality of the campaign optimizer component 775 may optimize bids according to targets and constraints on the bids, which may be set by the user or other system components. The constraints may include a maximum bid and a minimum bid. The targets may be associated with the listing and can be specified in terms of one or more metrics related to the performance of the listing. The campaign optimizer component 775 may analyze recent past analytics in connection with the metric and specify a bid recommendation forecasted by the bid optimizer functionality to achieve the target or get as close to the target as possible. In some embodiments, the campaign optimizer component 775 can also provide a recommendation for a listing, which may include a maximum bid and an update period, which update period can be a time between maximum bid hiding updates.

To facilitate ad campaign management and optimization, the pod 700 is also operative to collect visitor state data from the advertiser websites in accordance with one embodiment of the ad campaign management system of the present invention. To that end, the pod 700 utilizes a pod collection server 735, script server 740, and image server 745 to collect visitor state data and to store the same in the campaign data store 705. The collected visitor state data may then be used by various components of the pod 700 including, but not limited to, campaign optimizer component 775, forecasting component 790, and BIG 755 to generate ad campaign performance data in accordance with various embodiments of the present invention.

The methods of data collection in accordance with various embodiments of the present invention may include, but are not limited to, full analytic, campaign only, conversion counter and sampling. In one embodiment, full analytics collection provides the most robust collection method through the collection of marketing-based and free search-based leads. As a result, the advertiser may see a complete picture of how leads and conversions are generated. Specifically, this collection method provides a full funnel report indicating how visitors go from being a lead, to browser, to shopper, and, finally, to a paying customer. Visitor state storage on the campaign data store 705 may also allow for repeat and return customer report data and for a full suite of accreditation methods.

In another embodiment, the campaign-only analytics collection method is similar to full search but only paid marketing events are tracked and result events generated from free search are ignored or discarded. This method has the advantage of providing funnel and repeating visitor reports as well as a reduced data collection and storage rate. Campaign-only analytics method provides balance of rich report data and reduced collection, processing, and storage cost.

In yet another embodiment, conversion counter is the most simple analytics data collection technique available. With conversion counter analytics, the advertiser places a tag on pages where revenue is generated. The image server 745 places the lead "stack" in a cookie, which may be used to accredit the proper term/creative to the conversion event. This data collection mechanism generates enough data to provide optimization on creative weighting. It should be further noted that in one embodiment a direct accreditation method may be applied to conversion counter. In the conversion counter approach, visitor state may be stored on the client device, e.g., as a client side cookie minimizing the effect on pod 700 load and data storage requirements. Alternatively, the conversion counter approach may implement server-side storage of visitor state, which allows for improved performance and scalability at the cost of additional storage in a given pod 700. In another embodiment, a sampling method is utilized whereby only a random number of unique visitors, for example, 10 percent, are tracked, reducing data collection and storage requirements.

In order to allow for accreditation of the lead generation source to a conversion event, the state of the customer session on the advertiser's website may be maintained. Accreditation is the process by which all the marketing events are tied to a specific, or set of specific, marketing activities. There are two known approaches that may be utilized for storage of visitor state: client-side cookies and server-side database. Cookies may be used as an exemplary client-side visitor state storage. When cookies are used to store visitor state one of two methods may be used to set the state recorded in the cookie. A redirection server provided by the ad serving system of the present invention may be used on the lead generating event to add the visitor state to the cookie at the click event. Alternatively, a collection server may set the cookie at the time of a lead event.

A server-side database, such as the CDS 705, may also be used to store visitor state. Using server side storage in a database offers the high efficacy rates but at the additional cost of the storage. Using server side storage of visitor state allows the ad campaign management system to have more advanced accreditation models, which could allow for assist-based accreditation. Cookies-off users may still be traced as unique visitors so they can still be tracked (although at a reduced rate of accuracy) and thus are able to be included. Collection event processing time is decreased because the events may be logged and subsequently processed at a later point in time. Advantageously, with visitor state stored in the campaign data store, valuable marketing data can be collected and analyzed for internal use.

The pod 700 may also utilize a combination of the above-described client-side cookies and server-side database techniques to collect and maintain visitor state data. In particular, as indicate above the pod 700 utilizes pod collection server 735, script server 740, and image server 745 to collect visitor state data and to store the same in the campaign data store 705. In one embodiment of the invention, the pod collection server 735, script server 740 and image server 745 may be implemented, for example, as Java servlets, C++ objects or any other programming technology known to those of skill in the art.

Operation of the above-identified data collection components of the pod 700 is described in greater detail with reference to FIG. 8, which is a block diagram depicting tag-based data tracking and collection in accordance with one embodiment of the present invention. Generally, tagging techniques are used to facilitate automated tracking and collection of user activities or actions on the advertised Web property. The collected information may be of great value to advertisers or advertising agencies in assessing or analyzing the performance of sponsored and content match listings as well as banner ads. Furthermore, in some embodiments, the ad campaign management system of the present invention may utilize the collected information to optimize performance of one or more advertisements and ad campaigns.

Some embodiments of the invention utilize or may be combined with features or technologies, such as, for example, HTML tagging, data tracking, and related technologies, as described in U.S. patent application Ser. No. 09/832,434, filed on Apr. 10, 2001, entitled, "SYSTEM AND METHOD FOR MONITORING THE INTERACTION OF RANDOMLY SELECTED USERS WITH A WEB DOMAIN," and U.S. patent application Ser. No. 09/587,236, filed on Jun. 2, 2000, entitled, "SYSTEM AND METHOD FOR MONITORING USER INTERACTION WITH WEBPAGES", both of which are hereby incorporated herein by reference in their entirety.

Figure 8:
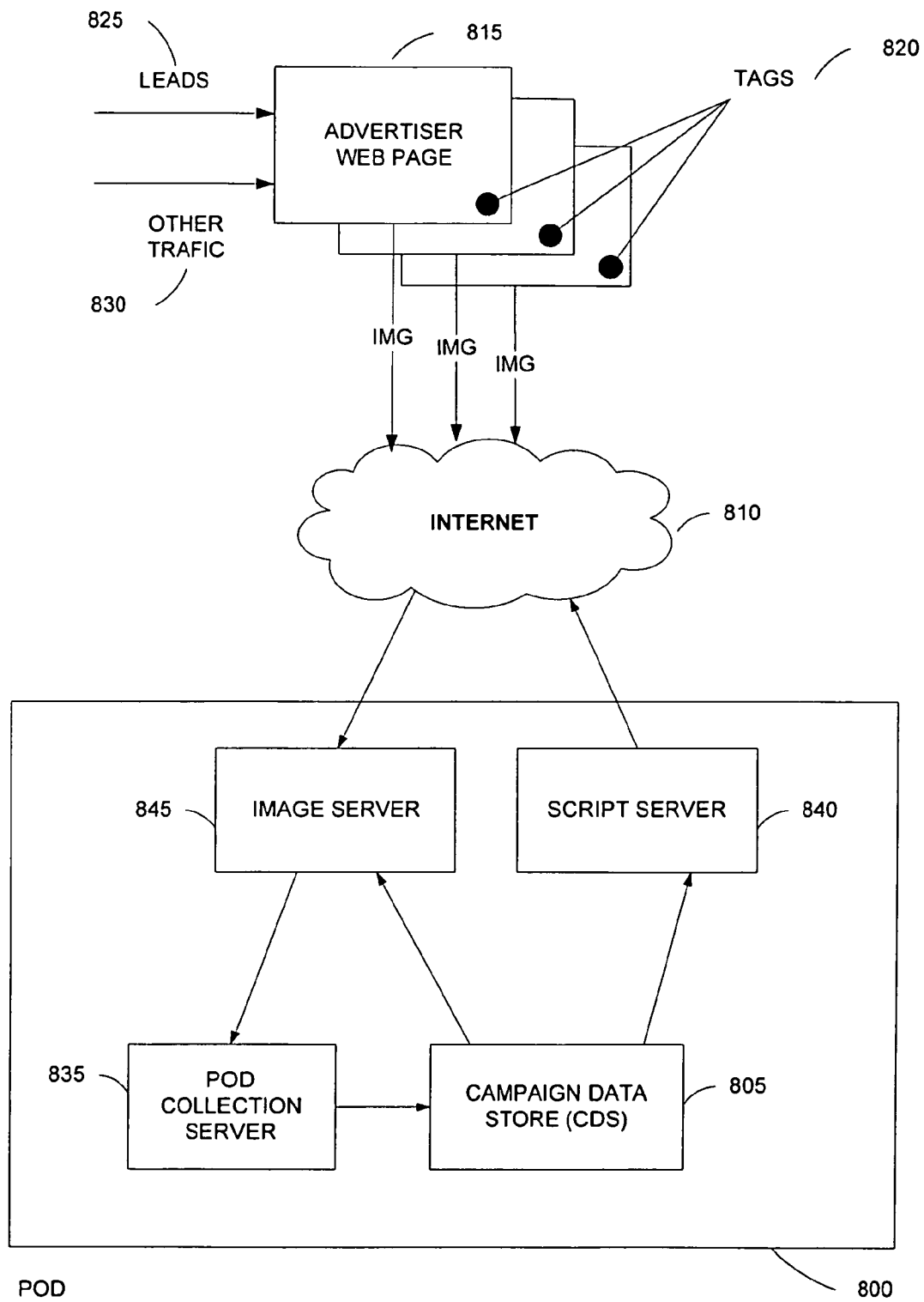
FIG. 8 is a block diagram illustrating a data collection system according to one embodiment of the invention.

As depicted in FIG. 8, an advertised Web property, which may include one or more websites having on or more webpages 815, receives page request traffic, which may include leads 825, which are hits on the webpage 815 resulting from users clicking on a search result listing of the advertiser, as well as other, non-lead traffic 830. After visiting the initial webpage 815, visitors may then click on links to navigate to another webpage, or pages, associated with the Web property. At some point, the user may, for example, place goods in a shopping cart, or actually make a purchase. The progress of the user deeper into the advertiser's (or other entity's) Web site, ultimately culminating, in some instances, in a purchase, is called "funneling".

The data collection component of the pod may recognize several stages of funneling, namely: impressions, leads, browser, shopper and conversion. An impression may be generated when the Internet users view the actual ad. A lead may be generated when the user clicks on the displayed ad. A browser event may be generated when following a lead, the user determines that what is being displayed relevant or related to what he seeks and proceeds to the second page within advertiser Web property. Thus, browser state may be triggered by the second page view. Shopper state may triggered when a user goes from non-secure to secure Internet connection, such as placing the item in his shopping cart and/or entering his credit card information. The secure connection may be established for example using SHTTP, SSL or any other public-key cryptographic techniques. Finally, a conversion may occur when the purchase is completed. For conversion to occur, the transaction may not necessarily involve money.

The use of a funnel allows data collection for only "relevant" or "important" events. For example, when a user is navigating Yahoo! Shopping in search for a new DVD player, the ad campaign management system of the present invention may not be interested in collecting data on every click a user makes on a displayed advertisement of a DVD player. Often, users click tens of offerings and then rejects them by navigating away from the advertised website. An advertiser may determine that it does not need to collect data on each of those clicks. Instead, the data only on, for example, the conversion, such as the actual purchase of a DVD player on the advertised website, or the advertisement that generated the conversion event is gathered by the ad management system of the present invention.

To facilitate collection of the visitor state data, tags 820 may be embedded into one or more webpages 815. In some embodiments, HTML-based tags 820 may be used to facilitate automatic tracking, collection, and use of traffic and collection of information that is then sent, for example, over the Internet 810 to the pod 800 for storage in the campaign data store 805. Using tags 820, leads may be distinguished from other traffic, and, depending in part on the configuration of the advertiser's webpage, tracked information sent to the pod 800 may, for example, include the number, frequency, and time of hits on various webpages, the deepest stage into the funnel for particular leads, whether shopping was conducted, whether a purchase was made, the type or amount of a purchase, and other information. In some embodiments, new pages added to the advertiser website may be automatically appropriately tagged.

Tags 820 may facilitate the passing of transaction ID values to the pod 800. A transaction ID value may be a unique value that is generated as a result of user activity, such as shopping activity, at an advertiser website. Transaction ID values may facilitate distinguishing between multiple shop and conversion events that occur within a single browser session. For example, if a second conversion event for the same revenue amount in a single browser session is detected, it may not be obvious whether such a purchase has actually occurred, or if the visitor has just refreshed or returned to the webpage with the conversion tag. However, generating a new transaction ID value for the second transaction makes it clear that a second conversion has occurred. In embodiments that do not use transaction ID values, an assumed limitation of one shopper and one conversion per browser session may be utilized.

In some embodiments, tagging may include placing a universal tag on all webpages 815 in the header of given web pages. Further, conversion tags may be placed above the universal tags on the transaction completion page, such as a "Thank You" page or a purchase confirmation page. The universal tag may consist of code used to capture any customer-specific information associated with the tracked HTML page. The universal tag may also identify and gather statistics for the pages in which it has been embedded. Additional tags may be utilized in other embodiments of the present invention. For example, a shopper tag may be used to indicate that a visitor has visited a page that indicates that the advertiser considers the visitor to be a shopper. In the absence of a shopper tag, a default rule may be used to specify that a transition of a visitor from an unsecured page to a secured page indicates that the visitor is a shopper.

The tag 820 may be operative to request a piece of JavaScript from the script server 840, called an instrumentation script, which marks the pages that are to be tracked. The instrumentation script may be downloaded the first time an end user views a tagged page. The instrumentation script may for example be downloaded into the visitor's browser on the first page load for the session. After the first load, the browser caches the script, which creates cookie. The script may not be downloaded again unless the user flushes his or her browser cache. When the browser leaves a tagged page, the instrumentation script may be halted, preventing further data collection.

In one embodiment of the present invention, the script server 840 is responsible for sending an instrumentation script, which may be JavaScript-based program code. The instrumentation script may depend on various client product and configuration settings. The delivered script may be used for filtering out unneeded events and may be operative to gather user web browser data points and delivering using image requests on events of interested to the advertiser. This allows script server 840 to act as a front line data cleanser system utilizing code at the client browser computer to perform future processing. The script server 840 may also deliver "null" scripts in the case an account cancels or defaults on our product. This functionality may prevent collection data from being received for invalid accounts.

The script server 840 may maintain a conversion counter for computing number of conversion events. For conversion counter customers, the script server 840 may incur the additional overhead of checking the cookie value to determine if a lead event for the account is in the users cookie stack. Should no lead event exist, the "null" script may be served so that no event traffic may be generated. Should a lead event exist for the account, a conversion counter script may be served. In one embodiment of the present invention, the conversion counter script may set a flag to notify the image server 845 to examine the cookie to determine the accreditation.

The content of the account scripts may be independently cached on a given script server 845 with a configurable portion to be maintained in memory to speedup the lookup process. A process on the script server 845 may be responsible for connecting to the campaign data store 805 and retrieving any account and script information that may have changed since the last refresh. The script server 845 may have sufficient memory allocated to keep the retrieved data cached. Furthermore, in one embodiment, a timed process may be executed periodically, e.g., every 15 minutes, on the script server 840 to retrieve any changed or added account information from the campaign data store 805.

The instrumentation script may collect user activity and send it to the image server 845 using a 1×1 .gif image request. In some embodiments, the instrumentation script may return two data packets per page view: one packet when the page loads and one packet when the page unloads (e.g., when the visitor transitions to subsequent page). Each data transmission occurs entirely in the background with no visitor impact, even for those with slow connections to the network. If a data transmission fails to take place, the instrumentation script may halt and stop gathering data.

The image server 845 may be operative to receive from the instrumentation scripts 1×1 pixel image requests, which include the data payload indicative of the customer browsing session on the advertised website. In one embodiment, the image server 845 may be operative to extract the payload data from the image request, analyze the extracted data, and deliver the payload data to the pod collection server 835. In one embodiment, the image server 845 may bundle up several minutes of payload data before transmitting it to the pod collection server 835. The image server 845 may also use a cache mechanism similar to that of the script server 840 to enable fast retrieval of account information from the campaign data store 805 and to provide for crash recovery during database down time according to one embodiment of invention.

In addition to the foregoing, the image server 845 may be operative to scan incoming events for a conversion counter flag to determine whether to examine the cookie for lead accreditation data. If the conversion counter flag is set, the image server 845 may need to perform additional processing in examining the cookie to determine the account lead accreditation data. The image server 845 may be further responsible for processing the image request events, determining any previous visitor state, and ultimately applying any proper accreditation of the event to some marketing activity.

A pod collection server 835 may be operative to receive the analytics payload provided by the image server 845. The pod collection server 935 may be further operative to retrieve any campaign data from the payload for storage in the campaign data store 805. In one embodiment, the ad campaign management system utilizes several pod collection servers 835 to improve system scalability. Multiple pod collection servers 835 may appear logically to the image servers 845 as a single device or component. Accordingly, the pod collection servers 835 may need to handle the situation where the image server 835 incorrectly sends the visitor state data to a different pod collection server. To handle this scenario, a request log database table (not depicted) may be kept to synchronize actions across several pod collection servers 835, such that an incorrectly sent data may be promptly forwarded to the correct pod collection server 835.

It should be noted that in some embodiments of the present invention all aforementioned components of the pod may be implemented on a single computer system, and, according to other embodiments, as a plurality of distributed computer systems interconnected by one or more networks, such as the Internet as well as combinations of one or more wide area networks, local area networks, personal area networks, etc. Furthermore, each of the components of the pod may be implemented as a computer program, which may be executed under the control of an operating system, such as Windows, Mac OS, UNIX, etc. Generally, the computer programs of the present invention may be tangibly embodied in a computer-readable medium, e.g., one or more data storage devices attached to a computer. Under the control of an operating system, the CPU may load computer programs from data storage devices into computer RAM for subsequent execution. The computer programs comprise instructions which, when read and executed by the CPU, cause the computer to perform the steps necessary to execute elements of the present invention.

Figure 9:
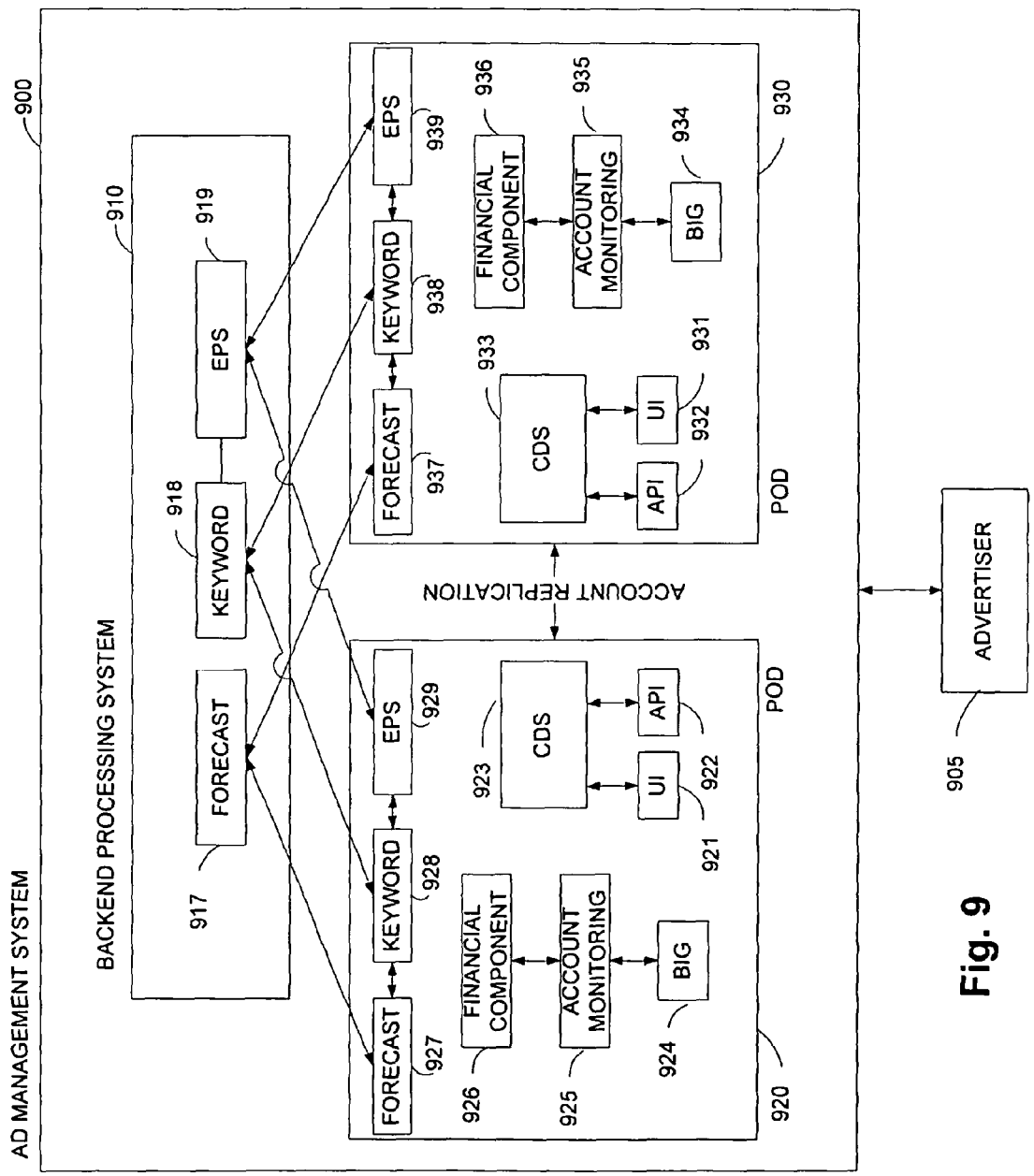
FIG. 9 is a block diagram presenting operation of the ad campaign management system according to one embodiment of the present invention.

FIG. 9 is a block diagram depicting ad campaign management system according to one embodiment of the present invention. As depicted, the ad campaign management system 900 comprises pods 920 and 930 operative to maintain user account data and to provide various tools for facilitating planning, management, optimization, delivery, communication, and implementation of advertisements and ad campaigns. The ad campaign management system 900 may also comprise a backend processing system 910, which is a powerful computing platform operative to support various services provided by pods 920 and 930. In one embodiment, the processing system 910 may comprise a plurality of CPUs running in parallel to perform computationally intensive processes associated with ad campaign optimization and other services provided by the ad campaign management system 900 of the present invention.

An advertiser 905 may access the ad campaign management system 900 by logging into the pods 920 using the provided interfaces 921 and 922. Depending on the advertiser access level, the pods 920 may retrieve from CDS 923 advertisement content associated with the advertiser account and provide one or more tools or services for managing advertisement campaigns. For example, to provide advertiser 905 with the ad campaign performance data, the pod 920 may invoke a BIG component 924 providing business reports and financial projections. Through the BIG 924, the advertiser 905 may obtain access to an account-monitoring component 925 to view, for example, the amount of money remaining in a given account. The advertiser 905 may also have an option of adding money to the particular ad campaign account or moving available funds between the accounts using a financial component 926. The changes made to the account may be stored in CDS 923. These changes may also be replicated into the pod 930 to update user account replica stored in CDS 933.

The ad campaign management system 900 may also allow advertiser 905 to view ad campaign performance data. For example, the advertiser 905 may wish to obtain statistics on the number of impressions or clicks that may be expected for an ad displayed in a particular position in various geographic markets and an estimated bid that needs to be placed on a particular search term for a given ad to be displayed in the desired position. To provide this service, the pod 920 may invoke an instance of a forecast component 917. The forecasting service is computationally expensive and time consuming because it requires collection and analysis of large amounts of data. To that end, the forecasting component 917 may delegate this task to the backend processing system 910, which may execute an instance of forecasting component to perform the requested task. The backend processing system may in turn connect to pod 930 to retrieve data required for performing the requested forecast.

The ad campaign management system 900 may also facilitate placement of user advertisements in various geographic markets around the world according to one embodiment of the present invention. To that end, the advertiser 905 may wish to utilize keyword suggestion functionality provided by the ad campaign management system 900 to identify the best terms for associating with a given ad. The pod 920 may invoke a keyword suggestion component 928 to provide advertiser with the requested service. In turn, the keyword suggestion component 928 may forward advertiser's request to the backend processing system 910 for processing. The keyword suggestion components 918 of the backend processing system 910 may perform the requested computation and return keyword suggestions to the keyword suggestion component 928 to be displayed to the advertiser 905.

In the event the advertiser 905 decides to submit a new ad for placement in the search results in various geographic markets, the content of a given ad may first be examined by the ad campaign management system 900 in accordance with one embodiment of the present invention. Thus, a new ad submitted by the advertiser 905 to the pod 920 may be first sent to an editorial processing system ("EPS") 927 for a review. It should be noted that due to the diverse laws and Internet regulations in various geographic markets where the new ad might appear, diverse editorial considerations may need to apply to the advertisement in accordance with one embodiment of the present invention. To that end, the EPS 927 may forward the submitted advertisement to EPS component 917 of the backend processing system 910. The EPS 917 may perform the requested editorial processing by applying the required business rules of the various geographic markets. If the ad fails this test, the EPS 917 may generate and return to the advertiser 905 comments and suggestions for revising the advertisement to comply with the given rules. The advertiser 905 may then revise his ad in accordance with the provided suggestions and to submit the revised advertisement to the ad management system 900 again for a more thorough, human editorial review.

Figure 10:
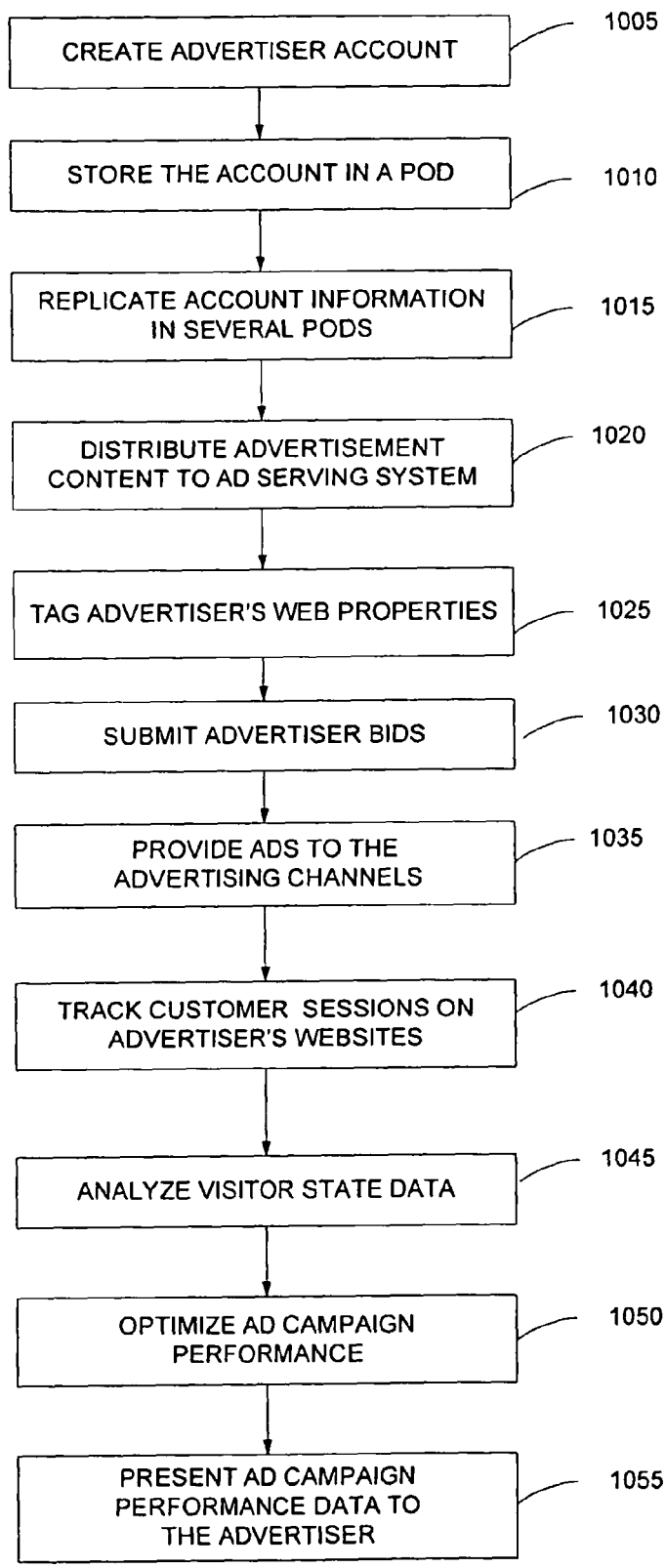
FIG. 10 is a flow diagram depicting operation of the ad campaign management system according to one embodiment of the invention.

FIG. 10 is a flowchart depicting the high level operation of the ad campaign management system in accordance with one embodiment of the present invention. At step 1005, the ad campaign management system may create a master account for a new advertiser. The advertiser may use the master account to manage one or more ad campaigns for the advertised Web properties, which may comprise one or more advertiser's websites. Furthermore, at this step, ad campaign management system may collect from the advertiser user profile information, login information, account access information, which may include a list of individuals or agencies that may have full or limited access to the master account, user preferences as well as other personal information, etc.

At step 1005, the advertiser may also set up one or more accounts to individually manage and budget the advertised Web properties. For each account, the advertiser may also set up individual access lists to specify access permissions for various individuals or agencies that may assist advertiser with managing of the advertised Web properties. Furthermore, the advertiser may create one or more advertisements and organize them in one or more ad campaigns based on various parameters, which may include advertising activities or conduct directed to accomplishing a common advertising goal, such as the marketing or sales of a particular product, service, or content, or group of products, services or content. Furthermore, the advertiser may arrange the ads in each ad campaign into one or more ad groups. A given ad group may include advertisements handled in a similar manner, such as an advertising tactic, e.g., sponsored search, content match and banner ad impression.

The collected account data is stored by the ad campaign management system in a pod, step 1010. The account information data may then be replicated to the pods around the world, step 1015. The advertisement content is then distributed using data distribution component distro to serving systems around the world, step 1020. Next, the ad campaign management system may tag advertised Web properties to facilitate collection of ad performance data, step 1025. For example, a tag may be used to track user visits, interactions, or purchases from a website to which a user navigates as a result of clicking on a given advertisement link. Depending on the specific needs and business objectives of a given advertiser, tags may be coded to collect specific information about a customer session that is of interest to the advertiser. Thus, some tags may enable collection of data on number of raw clicks on the advertiser website, while others tags may track numbers of clicks that resulted in conversions, e.g., purchase of a product or service from the advertiser website. In one embodiment of the present invention, HTML tags may be used to collect visitor state data from the advertiser website.

In one embodiment of the invention, at step 1030, the ad management system may submit to the marketplace operators around the world advertiser's bids on various search terms, which, may be optimized bids. When customers use terms in a search, the advertiser's listings or links are displayed among the search results. In some embodiments, the bids may be submitted for content match auctions, sponsored search auctions, and banner ad auctions. Furthermore, the ad management system may facilitate offer exchange arrangements at this step between advertisers and various advertising channels relating to ads, including suggesting and matching corresponding advertising channels and advertiser offers.

Next, the ad campaign management system may receive ad requests from various advertising channels, which may include particular entities, organizations, or the like, that facilitate distribution of ads for the advertised products, services and content of advertisers, such as search engines (e.g., Yahoo.com, Google.com, etc.), e-commerce sites (e.g., Amazon.com, Ebay.com, etc.), or other websites such as news or content providing websites (e.g., MSN.com, NYTimes.com, etc.), step 1030. In response to these requests, the ad serving systems may submit one or more ads to the advertising channels, step 1035. The submitted ads may be displayed along with the search results based on the magnitude of the bids made by the advertiser. Thus, the listings of the advertiser who has made the highest bid in a virtual auction on a given search term may be displayed first; the listing of the second highest bidder may be displayed second, and so on.

In response to providing ads, step 1035, the ad campaign management system may collect customer session data from the advertiser websites to facilitate ad campaign management and optimization, step 1040. For example, a given pod may separately perform collection of customer session data. To that end, in one embodiment, a pod may utilize a pod collection server, script server, and image server to collect visitor state data and to store the same in a campaign data store on a given pod. As described above, in various embodiments, the ad campaign management system may utilize several different data collection methods, including but not limited to, full analytics, campaign only, conversion counter, sampling method and various combinations thereof.

Visitor state data collected from the advertised websites may also be analyzed to determine ad campaign performance, step 1045. For example, the collected data may be processed to indicate the number of or what proportion of clicks on a sponsored link actually result in return of any sort to the advertiser. In addition, the ad campaign management system may generate various ad campaign performance metrics from the collected visitor state data. The generated metrics may include, but are not limited to, value per lead, return per lead, conversion rate, number of hits served by the advertiser website, cost per acquisition ("CPA"), return on advertising spend ("ROAS"), etc. In other embodiments, the generated ad campaign performance information may include many types of information indicating or providing a suggestion of how effectively ads, or ads presented though a particular advertising channel, etc., influence or are likely to influence user or consumer behavior. For example, an adverting channel, such as a given Yahoo! property, may collect performance information with respect to a particular sponsored search result listing. The information may include a number or percentage of viewers who clicked on the link, or who shopped at or purchased a product at the advertisers website as a result of the listing, etc. Yet in other embodiments, in analyzing ad and ad campaign performance, ad campaign management system may also collect various analytics data from advertising channels as well as third party analytics feeds, quality score data, and many other forms of ad campaign analytics. These data may be combined with the collected visitor state data in assessing ad campaign performance in accordance with various embodiments of the present invention.

The ad campaign management system may use the generated ad campaign performance data to optimize performance of the one or more ad campaigns, as well as the individual ad performance, step 1050. For instance, the system may attempt to increase the number of conversions from the displayed listings while minimizing cost of the campaign to the advertiser. To that end, in one embodiment, the ad campaign management system may utilize a campaign optimizer component. The campaign optimizer component may be operative to analyze visitor state data as well as the data received from the advertising channels, forecasting component, quality score component as well as the third party analytics feeds to determine how much to bid on which ads, how to allocate the campaign budget across different ads, how to spend money over the entire period of the campaign, etc.

The campaign optimization may also perform arbitrage between ads across various channels and tactics to determine where the limited ad campaign budget is most effective. In other embodiments, the ad campaign management system may also utilize a weight optimizer to optimize performance of individual ads. The weight optimizer may adjust weights (relative display frequency) for different elements and attributes of the ads displayed to the users and attach tracking codes to the ads, indicating which variant of each attribute of the ad was actually served. The behavior of the end-user then may be observed and the tracking codes may be used to provide feedback on the performance of each variant of each attribute of the ad. Furthermore, various other techniques known to those of skill in the art may be used to optimize performance of the individual ads and ad campaigns.

The ad campaign man agent system may present the collected ad campaign performance information to the advertiser, which may be presented in response to an advertisement request, step 1055. In particular, the system may allow advertiser to access the ad campaign information and ad campaign performance information saved in the pods around the world, search the information, analyze the information, obtain reports, summaries, etc. The stored ad campaign performance data may be presented to the user in various forms, including but not limited to, charts, tables, list, etc. In one embodiment, the system may provide a full funnel report that will provide a key view into how visitors of the advertiser website progress from being a lead, to browser, to shopper, and, finally, to a paying customer. In some embodiments, the ad campaign management system of the present invention may provide comparisons of performance of components of ad campaigns, such as performance of particular listings, search term creatives, channels, tactics, etc. In other embodiments, the ad campaign management system may provide advertiser with various ad campaign performance metrics, such as value per lead, return per lead, conversion rate, number of hits served by the advertiser website, cost per acquisition ("CPA"), return on advertising spend ("ROAS"), etc. Furthermore, based on this information, the system may allow advertisers to make changes to the account, such as change listings or bidding strategies, change budgets allocated between different ad campaigns, create new ads and ad campaigns, etc.

Figure 11:
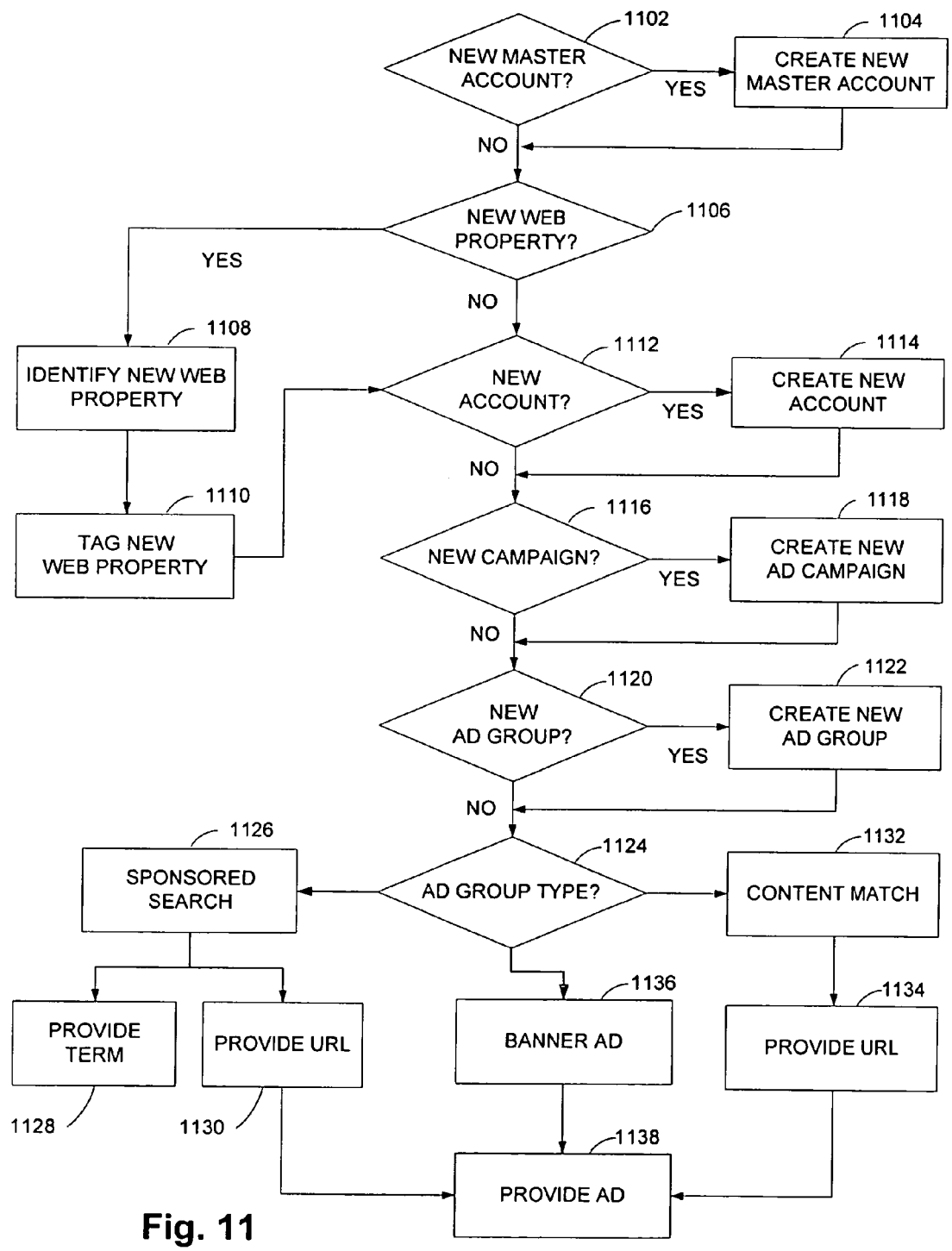
FIG. 11 is a flow diagram depicting operation of the ad campaign management system according to another embodiment of the invention.

FIG. 11 is a flowchart depicting a method for using the ad campaign management system in accordance with one embodiment of the present invention. When a user logs into the ad campaign management system, the system may determine whether the user is attempting to access an existing master account associated with one or more of the advertised Web properties, step 1102. If the user is new to the system and does not have a master account yet, the ad campaign management system may create a new master account for the given user, step 1104. At this step, ad campaign management system may also compile a user profile, which may include login information, account access information, which may include a list of individual or agencies that may have full/limited access to the master account, user preferences as well as other user information.

At step 1106, the ad campaign management system may determine whether the given master account has one or more Web properties associated therewith. If a newly created master account does not have at least one Web properties associated therewith, the ad campaign management system may request the user to identify one or more Web properties to be associated with the given master account, step 1108. In one embodiment of the invention, the user may specify one or more Web properties to be associated with the new master account. Alternatively, a Web property may include a website, or a combination of related websites and pages for which the advertiser is advertising.

The one or more webpages associated with the specified Web property may also be tagged to allow automatic tracking and collection of data indicative of customer session on the advertised website, step 1110. In various embodiments, depending on specific needs and business objective of a given advertiser, tags may be coded to collect specific information about the customer session that is of interest to the advertiser. Thus, some tags may enable collection of data on number of raw clicks on the advertiser website, while others tags may track numbers of clicks that resulted in conversions, e.g., purchase of a product or service from the advertiser website. Furthermore, using tags, leads can be distinguished from other traffic, and, depending in part on the configuration of the advertiser's webpage, tracked information may include the number, frequency, and time of hits on various webpages, the deepest stage into the funnel for particular leads, whether shopping was conducted, whether a purchase was made, the type or amount of a purchase, and other information.

The ad campaign management system may determine whether an account has already been created for each Web property associated with the master account, step 1112. In one embodiment, the ad campaign management system of the present invention may maintain a separate account for each Web property associated with the master account. An account may be used to manage ad campaign spendings associated with individual Web properties. If an account has not been created yet, the ad campaign management system may create, at step 1114, a new account for each Web property associated with master account of a given advertiser. The advertiser may also specify different access parameters and access lists for a given new account.

The system then determines whether any ad campaigns have been created for the given Web property, step 1116. An ad campaign may include a set of one or more advertising activities or conduct directed to accomplishing a common advertising goal, such as the marketing or sales of a particular product, service, or content, or group of products, services or content. Two ad campaigns may be considered disparate when the ad campaigns are directed to different advertising goals. For example, an advertiser may wish to advertise a product for sale and a service associated with this product. Thus, the advertiser may store separate ad campaigns for advertising the product and the service. If no ad campaigns exist on the system for the given Web property, at step 1118, the ad campaign management system may prompt the advertiser to create one or more ad campaigns.

In one embodiment of the present invention, at step 1120, the ad campaign management system may determine whether any ad groups have been created for a given ad campaign. An ad group may be a conceptual compartment or container that includes ads and ad parameters for ads that are going to be handled in a similar manner. For example, an ad group may be directed to a given audience, a demographic group, or a family of products. For example, an ad group may be related to a given manufacturer's products, such as Sony, Microsoft, etc. or a family of high-end electronics, such as TVs, DVDs, etc. There is a number of ways in which a given group of ads may be managed in a similar manner. For example, an advertiser may specify that there be a certain markup (e.g., 50%) on items in a given ad group, may want to distribute all those ads in a certain way, or may want to spend a certain amount of its budget on those advertisements. If no ad groups exist in a given ad campaign, at step 1122, the system may prompt the advertiser to create one or more ad groups for a given ad campaign.

In one embodiment of the present invention, at step 1124, the ad campaign management system may determine the type of a given ad group and prompt the user to provide necessary element and parameters for the ads in a given ad group. In one embodiment, at step 1126, one or more ad groups may be associated with the sponsored search tactic. For these ads, the advertiser may provide one or more search terms associated with the given listing, step 1128, a URL to the webpage where the ad should take the customer to if clicked on, step 1130, and the text of the creative, step 1138. In another embodiment, one or more ad groups may be associated with the content match tactic, step 1132. For these ads, the advertiser may provide a URL to the webpage where the ad should take the customer to if clicked, step 1134, and the text of the creative, step 1138. Yet in another embodiment, at step 1136, one or more ad groups may be associated with the banner ads. For these ads, the advertiser may only provide, at step 1138, the text of the creative.

Figure 12:
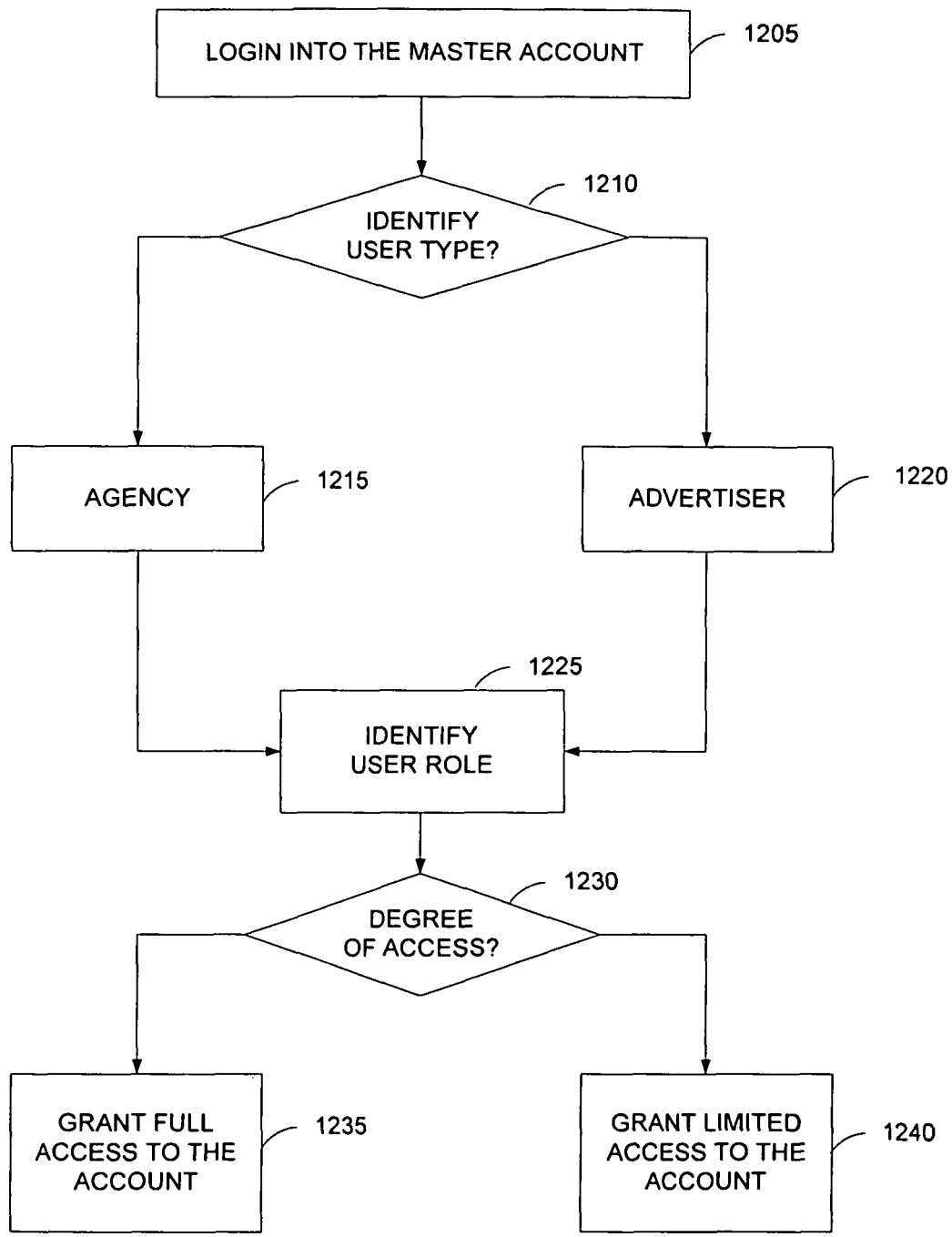
FIG. 12 is a flow diagram illustrating a method for accessing the ad campaign management system according to one embodiment of the present invention.

FIG. 12 a flowchart depicting a method for accessing ad campaign management system in accordance with one embodiment of the present invention. At step 1205, the user of the system may log into the master account of the ad campaign management system, which may cause the system to consult an access list to determine user type and the associated account access privileges, step 1220. In one embodiment, two types of users may be recognized that have access to one or more accounts associated with on or more Web properties: advertisers and agencies. An advertiser may have set up the master account and delegated a responsibility for managing its various Web properties to one or more agencies. In this scenario, the advertiser may have access to all accounts, and the agency may have access to one or more designated accounts. In another embodiment, an advertising agency may have created the master account and uses it to offer advertising service to advertisers. In this scenario, the agency may have access to all accounts and may allow limited account access to the advertiser. Thus, based on the login information, the ad campaign management system may determine, at steps 1215 and 1220, whether the user is an agency or advertiser and which accounts may the user access.

A user role may be ascertained, which determines the degree of access to the given account, step 1225. Each role may define different levels of permissive actions: some roles may allow copying of account data, some roles may allow reading only, yet other roles may allow to update account data, etc. For example, an advertiser may delegate access to the particular areas of the given account to the advertising agency and delegate access to another area of the account to another organization or individual, such as a freelance graphic designer. Different user roles may be store by the ad campaign management system in an access table of a given account. Thus, at step 1230, the ad campaign management system may consult its access table to ascertain the role of the user. Then, at step 1235, the system may grant a full account access to the user or, as indicated at step 1240, may grant a limited access to the account.

Figure 13A:
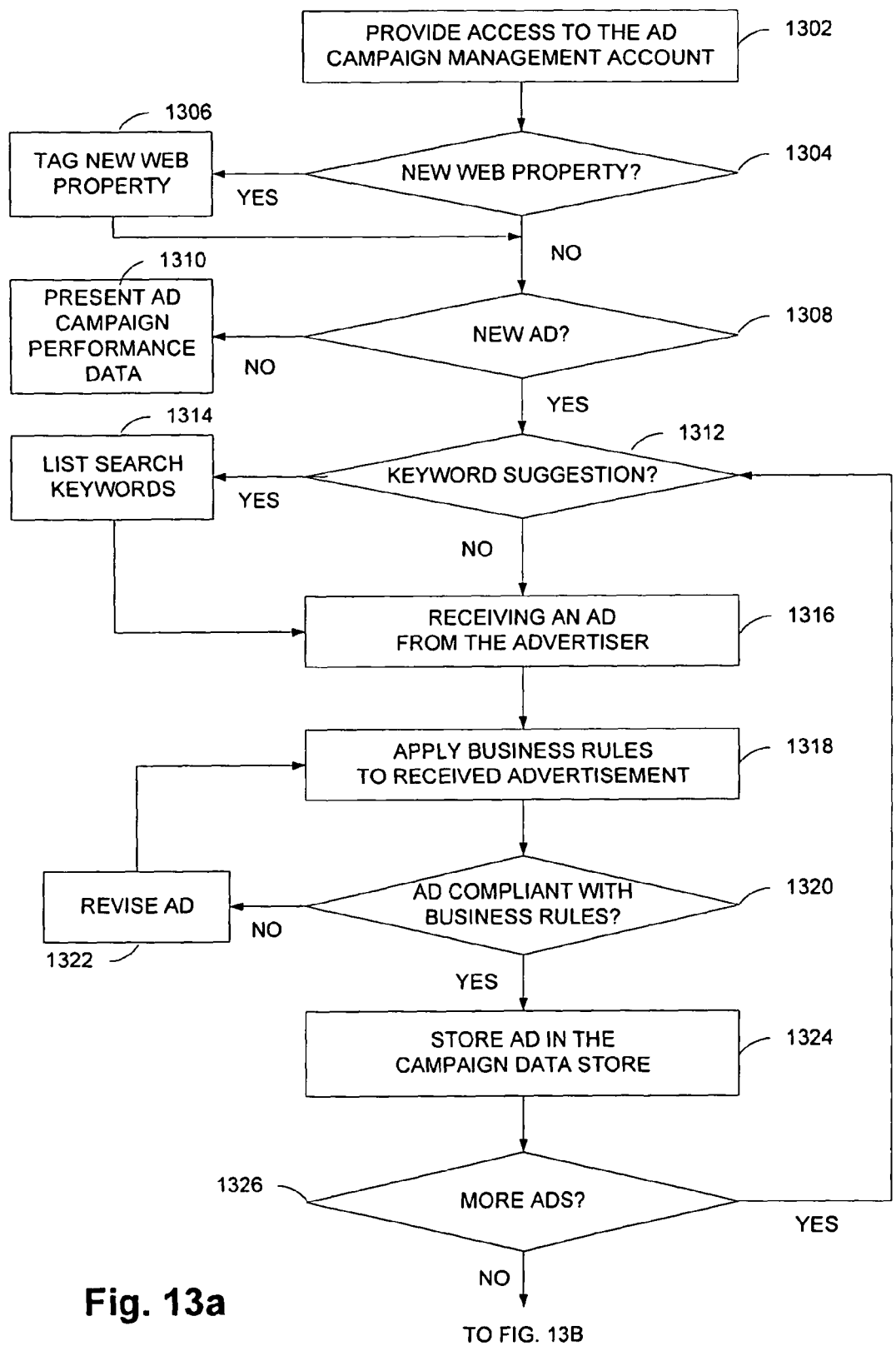
FIG. 13A-C are flow diagrams depicting a method for operation of a pod according with one embodiment of the present invention.
Figure 13B:
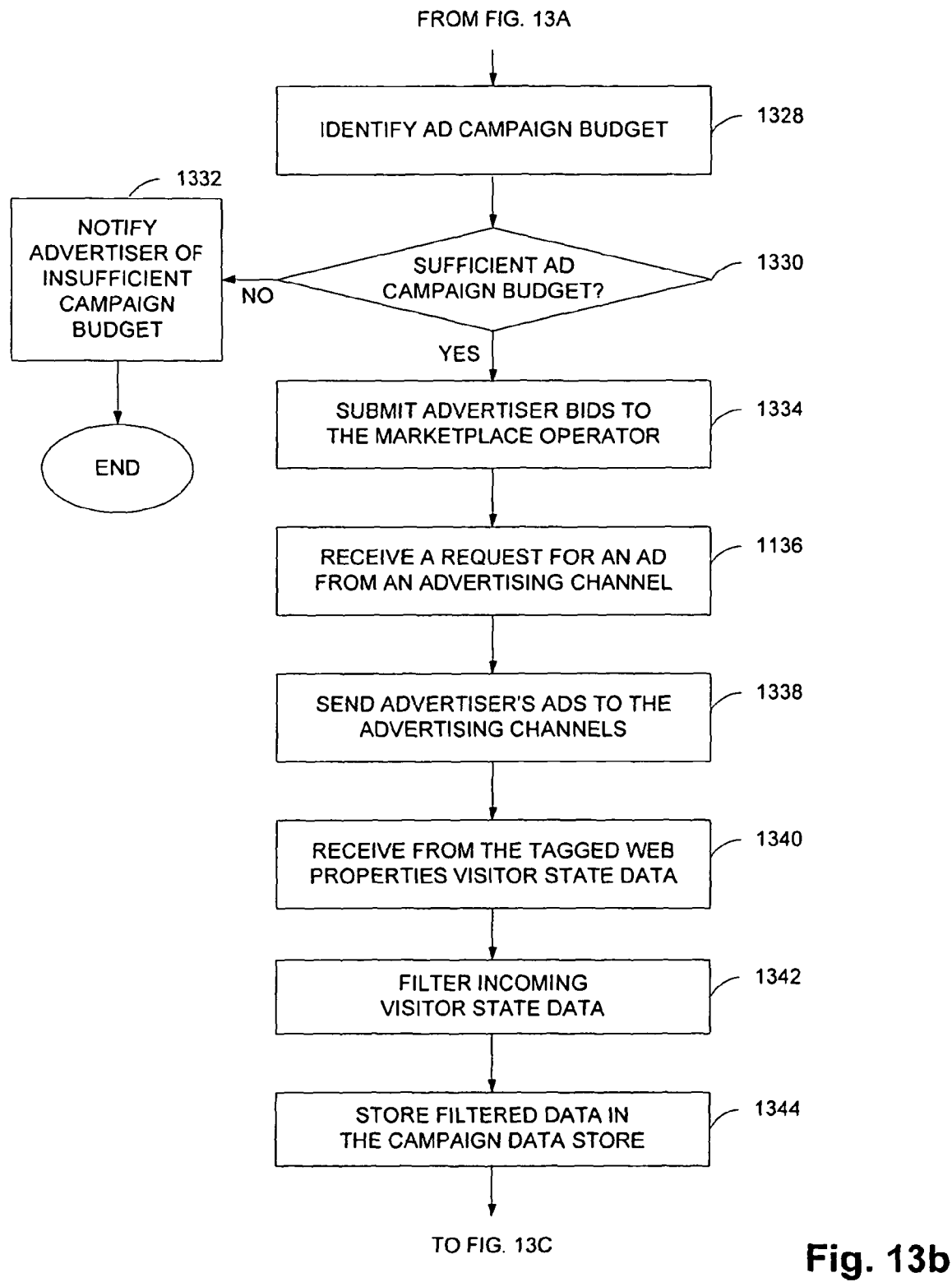
Figure 13C:
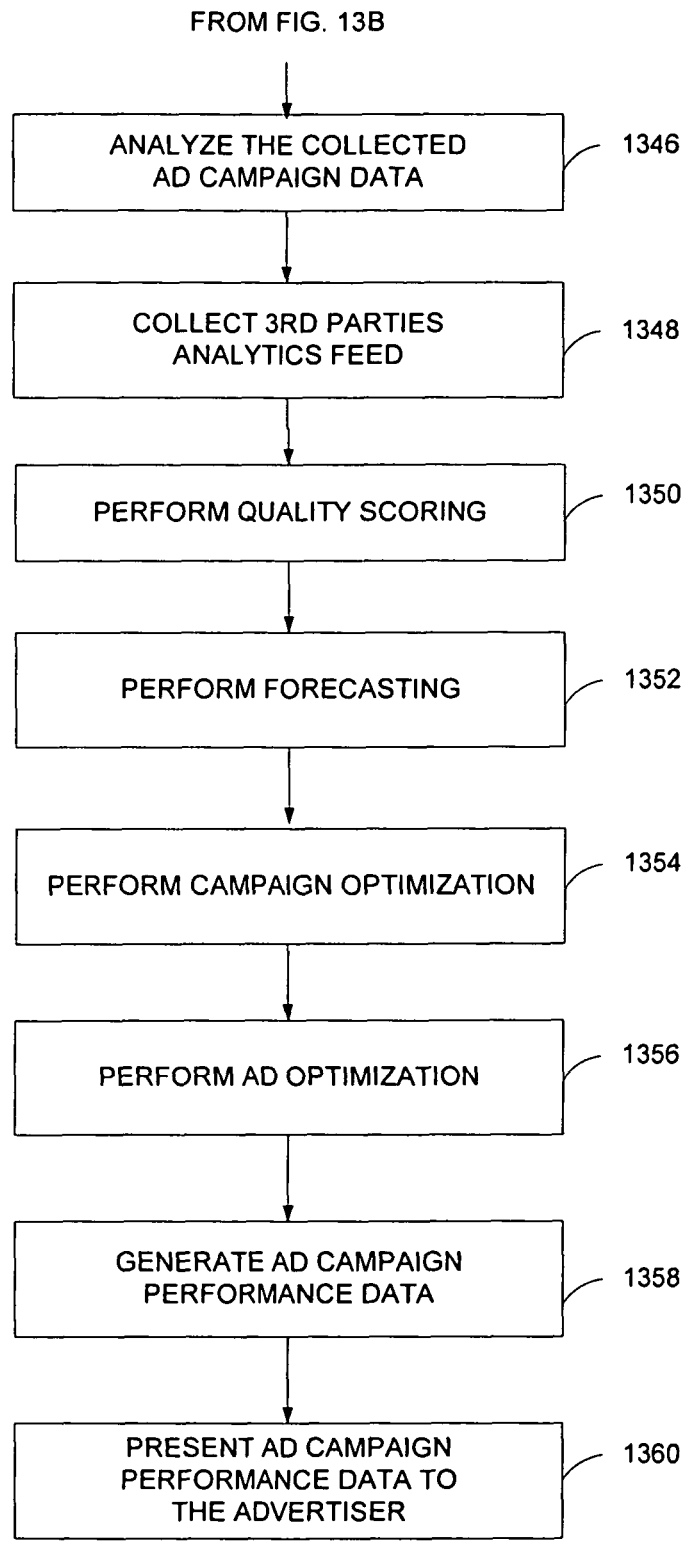

FIG. 13A-C are flowcharts depicting operation of the ad campaign management system according to one embodiment of the present invention. The system may present a user with an interactive user interface (UI) that may provide user access to master account maintained by the ad campaign management system of the present invention, step 1302. The system may then ascertain whether any Web properties are associated with the master account, step 1304. If the master account is new and does not have any Web properties associated therewith, or the user desires to associate a new Web property with the master account, the system may tag the identified Web properties to enable automatic tracking and collection of data indicative of customer session, step 1306.

The ad campaign management system may then determine whether a given Web property has any ads or ad campaigns associated therewith and whether the user wishes to create new ad listings, step 1308. If the given Web property has one or more ads associated therewith and the user does not wish to create new ads, the system may present ad campaign performance data to the user and to allow the user to manage its accounts, step 1310. If the user wishes to create a new ad campaigns or to add new ads to the existing ad campaigns, the system may provide the user with a different set of tools or interactive UI that may allow the user to make changes or create new ads. Thus, in one embodiment of the invention, for the sponsored search listings, the system may offer to the user a keyword suggestion function to search for available search terms, step 1312. If the user decides to use the provided keyword suggestion function, the system, may generate a list of available search terms related to the given ad, step 1314. Alternatively, the user may decline to use the offered keyword suggestion function and may submit the new listing to the system, step 1316.

The ad campaign management system may submit the new ad to the editorial processing system ("EPS") that will apply various business rules to determine the accuracy and the relevance of the new ad, step 1318. The EPS may, for example, detect inappropriate content in the advertiser listings or illegally used trademark terms, step 1320. In some embodiments, the EPS may perform a quick check to determine whether to reject the ad automatically before it is submitted to a human editor for review. In one embodiment, the EPS may respond with annotation such as rejected, approved, rejected but suggested changes, etc. If a given ad is rejected, the user may revise the ad based on the annotations and comments supplied by the EPS, step 1322. Once the ad complies with various business rules applied by the system, the ad may be store in a campaign data store in a given pod, step 1324. The system may then check, step 1326, if the user wishes to create more ads and to repeat steps 1312 through 1326 for every new or revised ad submitted by the user.

The user may identify budgets available for the advertisement of a given Web property and, more specifically, for the ad campaigns associated with the given Web property, step 1328. In some embodiments, the advertiser may specify minimum and maximum bid values that may be placed by the ad campaign management system in virtual auctions hosted by various marketplace operators around the world. Furthermore, the advertiser may specify various business rules and bidding schemes to be used by the ad campaign management system in managing and optimizing its ad campaign performance. The system may submit the budget allocation data to the account-monitoring component for processing and evaluation. Furthermore, in one embodiment, the budget and bid data may be submitted to the bid and campaign optimization components of the ad campaign management system for processing and evaluation.

The ad campaign management system may determine whether an account contains sufficient budget, step 1330. If the allocated budget is insufficient, the system may notify the advertiser of insufficient account balance, step 1332, and end the process. Depending on the campaign budget, the system may employ different bidding techniques to optimize campaign budget. For example, the ad campaign management system may employ a bidding scheme pursuant to which advertiser bids may be lowered to reduce frequency of the displayed ads, which may decrease advertiser spendings. Another example of budgeting is to throttle the rate at which advertisements are being served (e.g., a fraction of the time it is served) without changing the advertiser's bid (whereas in the previous example the bid was changed, not rate at which advertisements were served). Another example of throttling is to not serve an ad as often as possible but put it out according to a rotation.

The ad campaign management system may then submit advertiser bids to one or more virtual auctions hosted by various marketplace operators around the world, step 1334. The bids may be submitted based on one or more of the aforementioned strategies. The advertisers may auction and bid for search terms or groups of terms, which, when used in a search by customers, cause display of their advertisement listings or links among the display results. Also, advertisers may bid for position or prominence of their listings in the search results. The advertisers may participate in various auctions, such as content match auction, sponsored search auctions, banner ad auctions, etc. Furthermore, ad campaign management system may proxy various arrangements and deals between the advertiser and the advertising channels relating to ads, including suggesting and matching corresponding advertising channels and advertiser offers.

The ad campaign management system may then distribute all advertisements to the ad serving systems around the worlds, step 1336. Based on the results of the virtual search term auctions, the ad serving system may submit to the advertising channels one or more ads related to the Internet user search terms, step 1338. The submitted ads may be displayed along with the search results based on the magnitude of bids posted by the advertiser. Thus, the listings of the advertiser who has made the highest bid in a virtual auction on a given search term may be displayed first; the listing of the second highest bidder may be displayed second, and so on.

The ad campaign management system may then collect from the tagged Web properties visitor state data, step 1340. For example, each pod may separately perform collection of visitor state data. To that end, in one embodiment, a pod may utilize a pod collection server, script server, and image server to collect visitor state data. The ad campaign management system may utilize different filtering techniques for collecting only visitor state data relevant to the given advertiser business objectives, step 1342. To that end, the system may utilize several different data collection methods, including but not limited to, full analytics, campaign only, conversion counter, sampling method and various combinations thereof. The collected visitor state data may be stored in an ad campaign data store of a given pod, step 1344.

The ad campaign management system may analyze the collected visitor state data to evaluate ad campaign performance, step 1346. For example, the collected data may be processed to indicate how many or what proportion of clicks on a sponsored link actually result in return of any sort to the advertiser. In some embodiments, the ad campaign management system may generate from the collected visitor state data various ad campaign performance metrics such, as value per lead, return per lead, conversion rate, number of hits served by the advertiser website, cost per acquisition ("CPA"), return on advertising spend ("ROAS"), etc. In other embodiments, the generated ad campaign performance information may include many types of information indicating or providing a suggestion of how effectively ads, or ads presented though a particular advertising channel, etc., influence or are likely to influence user or consumer behavior. The information may include a number or percentage of viewers who clicked on the link, or who shopped at or purchased a product at the advertisers website as a result of the listing, etc.

The ad campaign management system may supplement visitor state data with various forms of third-party analytics data received, for example, from the advertising channels, search engines, Internet service providers ("ISP"), etc., step 1348. This data may be combined with the collected visitor state data by the ad campaign management system in assessing ad campaign performance in accordance with various embodiments of the present invention. The ad campaign management system may also use the collected visitor state data and third-party analytics data to optimize performance of one or more advertisements and ad campaigns according to one embodiment of the present invention.

The ad campaign management system may also perform quality scoring of individual ads, step 1350. The quality score may be calculated by the search serving components and fed into the ad campaign management system. In some embodiments, the quality score may be displayed to the advertiser, so that advertiser may revise the ad to improve its quality score. For example, if an ad has a high quality score, then the advertiser knows that they should not try to spend money and time trying to perfect the ad. However, if an ad has low quality score, it may be revised to improve ad's quality score.

The ad campaign management system may also perform term forecasting, step 1352. In some embodiments, the forecasting may be used to predict keywords trends, forecast volume of visitor traffic based on the ad's position, as well as estimating bid value for certain ad positions. The forecasting may be also used in some embodiments to analyze past performance and to discover search term trends in the historical data. In yet another embodiment, the forecasting may provide event-related macro- and micro-trending. In other embodiments, the forecasting may be used to analyze the historic data to predict the number of impressions or clicks that may be expected for an ad having a particular rank. In another embodiment, the forecasting may be used to predict a bid value necessary to place the ad in a particular position.

The ad campaign management system may also perform campaign optimization, step 1354. During this step, the ad campaign management system may use the collected visitor state data, the third-party analytics data, quality score data as well as forecasting data to determine how much to bid on which ads, how to allocate the campaign budget across different ads, how to spend money over the entire period of the campaign, etc. Furthermore, the ad campaign management system may also perform arbitrage between ads across various channels and tactics to determine where the limited ad campaign budget is most effective.

The ad campaign management system may also optimize performance of individual ads, step 1356. To that end, the weight optimizer may be used to adjust weights (relative display frequency) for different elements and attributes of the ads displayed to the users and attach tracking codes to the ads, indicating which variant of each attribute of the ad was actually served. The behavior of the end-user then may be observed and the tracking codes may be used to provide feedback on the performance of each variant of each attribute of the ad. Furthermore, various other techniques known to those of skill in the art may be used to optimize performance of the individual ads.

The ad campaign management system may also generate ad campaign performance data, step 1358, and present the same to the user, step 1360. For example, the system may allow advertiser to access the ad campaign information and ad campaign performance information saved in the pods around the world, search the information, analyze the information, obtain reports, summaries, etc. The stored ad campaign performance data may be presented to the user in various forms, including but not limited to, charts, tables, list, etc. In one embodiment, the system may provide a full funnel report that will provide a key view into how visitors of the advertiser website go from being a lead through to browser, shopper, and finally a paying customer. In some embodiments, the ad campaign management system of the present invention may provide comparisons of performance of components of ad campaigns, such as performance of particular listings, search term creatives, channels, tactics, etc. In other embodiments, the ad campaign management system may provide advertiser with various ad campaign performance metrics, such as value per lead, return per lead, conversion rate, number of hits served by the advertiser website, cost per acquisition ("CPA"), return on advertising spend ("ROAS"), etc.

Figure 14:
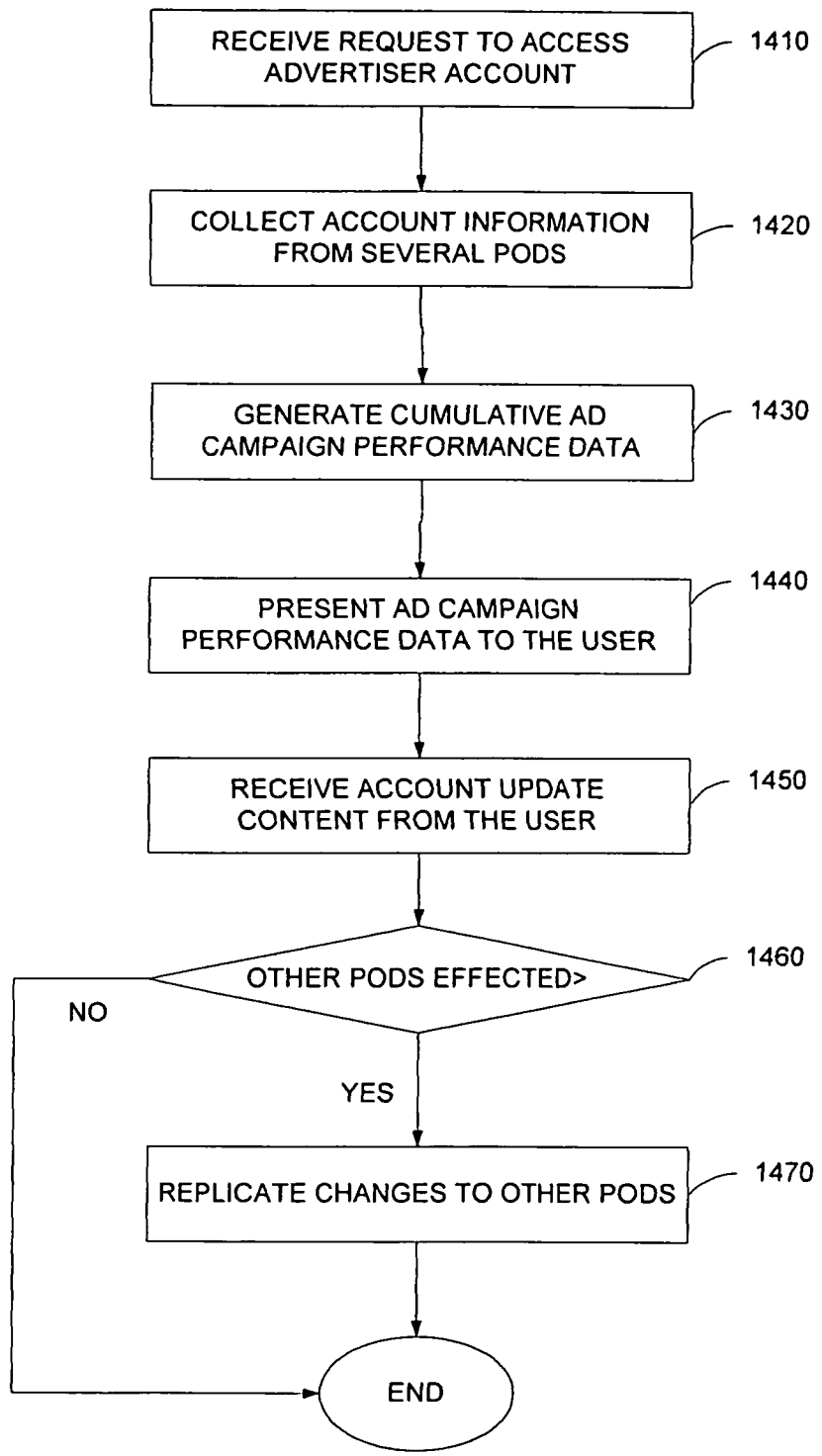
FIG. 14 is a flow diagram depicting method for account replication according to one embodiment of the present invention.

FIG. 14 is a flow diagram depicting method for replication of the accounts across several pods according to one embodiment of the present invention. A pod may receive a request from an advertiser to access a given user account, step 1410. The pod may then collect account information, including ad campaign performance data from the several pods, step 1420. The pod may then process the collected ad campaign performance data to generate cumulative ad campaign performance data, step 1430. The step of data processing may comprise the pod delegating some of the processing to the backend processing system. Next, the pod may present the cumulative ad campaign performance data to the advertiser, step 1440. In the event that the advertiser attempts to make any changes to given account, the pod receives the updated content and information, step 1450. For example, the advertiser may wish to update bid values for one or more advertisements in a given ad campaign. The pod may then determine whether changes made to the account effect any other pods containing replicas of the given account, step 1460. In the event such changes do affect other pods, the changes are replicated to the effected pods, step 1470. Otherwise changes are not replicated and the process ends.

Figure 15:
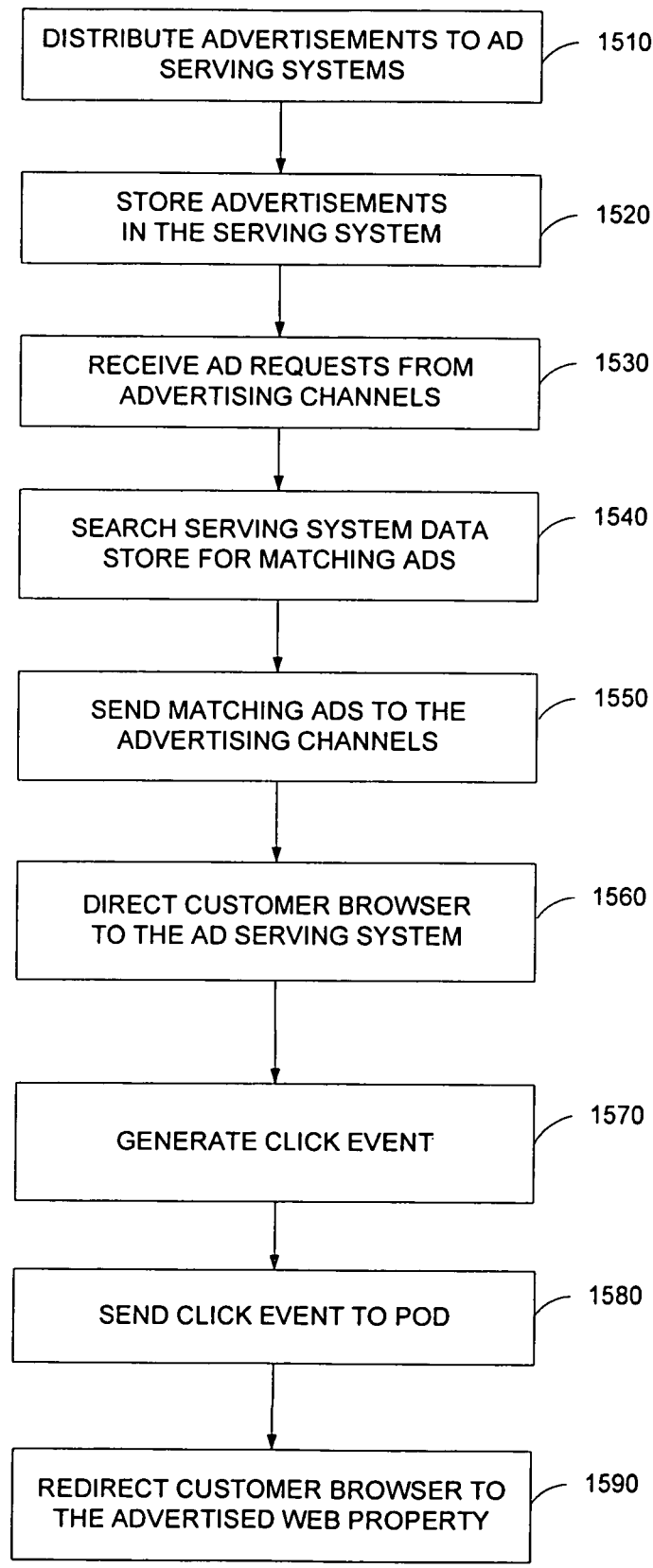
FIG. 15 is a flow diagram depicting method for distribution of the advertisement content according to one embodiment of the present invention.

FIG. 15 is a flow diagram depicting operation of the advertisement distribution system according to one embodiment of the present invention. The distro component distributes advertisements to the one or more ad serving systems, step 1510. The ad serving system may comprise an ad data store, sponsored search server, a content match server and a redirect server according to one embodiment of the present invention. The advertisements are stored in the data store of the ad serving system, step 1520. The sponsored search server and content match server receive advertisements requests from various advertising channels, step 1530. The sponsored search server and content match server may then query ad data store to search for advertisements matching the search terms provided by the advertising channels' requests, step 1540. Once the matching ads have been received from the data store, the sponsored search server and content match server transmit these matching ads to the advertising channel, step 1550. Once a customer clicks on the advertisement provided by the one of the advertising channels the customer browser is directed to the redirect server of the ad serving system, step 1560. The redirect server in turn generates a click event, step 1570, and sends it to the BIG component on a given pod, step 1580. The redirect server then redirects the customer browser to the advertised Web property, step 1590. The click event received at the pod may be used to trigger a data collection process discussed in greater detail herein with reference to FIG. 16.

Figure 16:
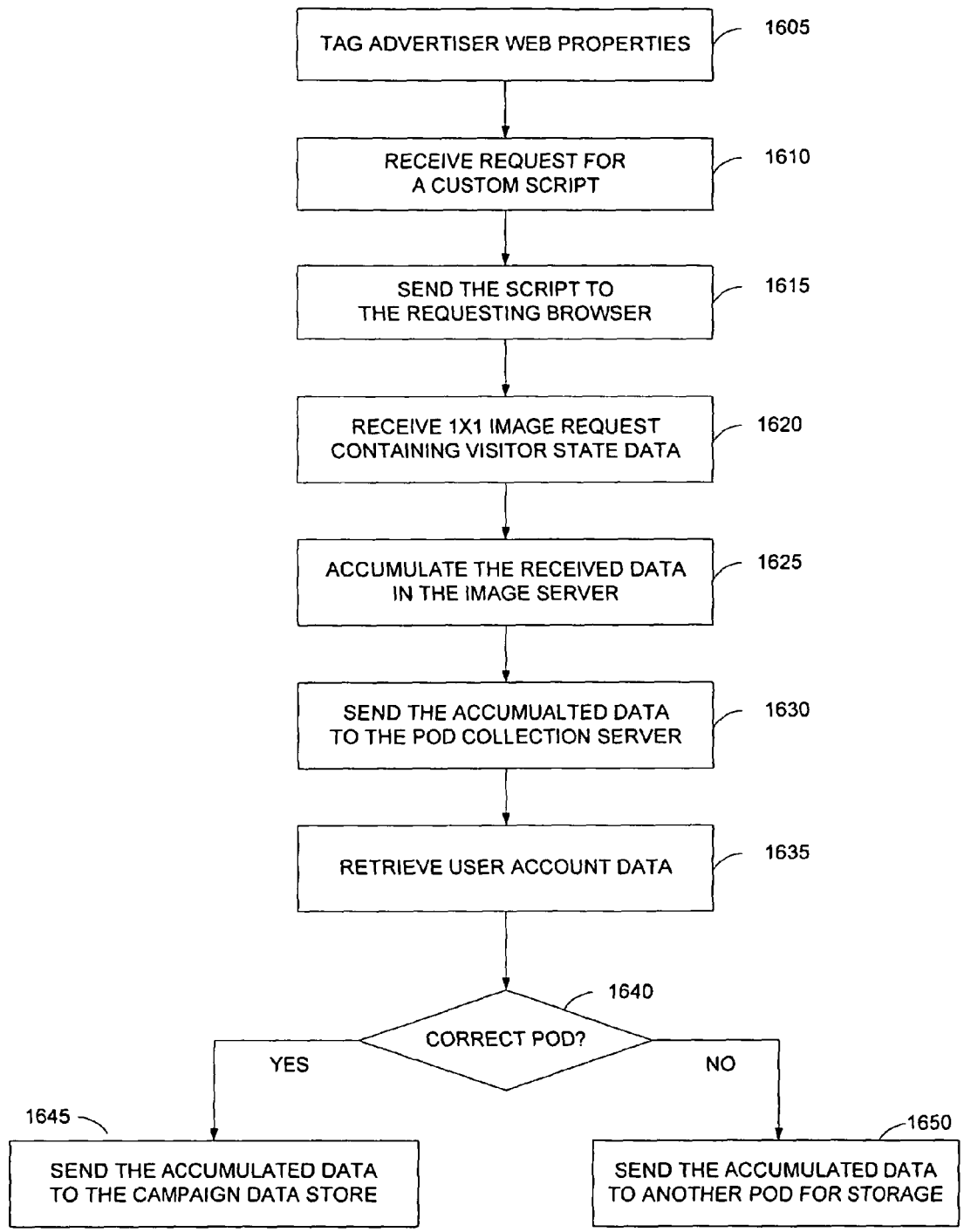
FIG. 16 is a flow diagram depicting the collection of visitor state data according to one embodiment of the present invention.

FIG. 16 is a flowchart diagram depicting visitor state data collection method in accordance with one embodiment of the present invention. The ad campaign management system may tag advertised Web properties to facilitate automated tracking and collection of user activities or actions on the advertised Web property, step 1605. The collected information may be of great value to advertisers or advertising agencies in assessing or analyzing the performance of sponsored and content match listings as well as banner ads. Furthermore, in some embodiments, the ad campaign management system of the present invention may utilize the collected information to optimize performance of one or more advertisements and ad campaigns.

The ad campaign management system may provide a script server operative to receive from the tagged Web properties a request for a script, e.g., JavaScript, which is also called instrumentation script, step 1610. The request for the instrumentation script may send to the script server the first time when an end user views a tagged page, e.g., on the first page load for the browsing session. The script server may send the requested instrumentation script to the visitor's Internet browser, step 1615. After the first load, the browser may cache the script, ultimately creating a cookie. The script may not be downloaded again unless the user flushes his or her browser cache. When the browser leaves a tagged page, the instrumentation script may be halted and gather no more data. In one embodiment of the present invention, the instrumentation script may be customized to collect and transmit to the ad campaign management system only visitor state data that is of interest to the advertiser.

The ad campaign management system may provide an image server operative to receive from the instrumentation script visitor state data delivered using 1×1 .gif image requests on events of interested to the advertiser, step 1620. In some embodiments, the instrumentation script may return two data packets per page view: one packet when the page loads and one packet when the page unloads (e.g., when the visitor transitions to the next page). Each data transmission occurs entirely in the background with no visitor impact, even for those with a slow modem connection. If a data transmission fails to take place, the instrumentation script may halt and stop gathering data.

The image server is operative to receive the image request, unload the payload, determine the target pod and deliver the payload to the target pod collection server, step 1630. In some embodiments, the image server may process image request events, determine any previous visitor state, and apply any proper accreditation of the event to some marketing activity. In one embodiment the image server may be operative to accumulate several minutes of data going to each pod before sending it to the pod collection server, step 1625.

A pod collection server is operative to receive the analytics payload submitted by the image server and to determine the correct pod to store the collected visitor state data, step 1640. To that end, the pod collection may retrieve user account from the pod's central data store and determine from the user account information the correct pod to store the collected visitor state data, step 1635. Alternatively, the pod collection server may utilize a request log database table (not depicted) to synchronize actions across several pod collection servers, so that the visitor state may be forwarded to the correct pod. Thus, in the event the pod collection server determines that visitor state data has been received at the correct pod, the pod collection server may store the received data in a campaign data store for the given pod, step 1645. In the event the pod collection server determines that visitor state data has been received at the incorrect pod, the pod collection server will refer to the request log database to determine the correct pod assignment and may forward the received data to the pod collection server residing on the identified pod, step 1650.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:
1. A method, comprising:
receiving over a computer network, at a server of the computer network, advertisement information including an indication of a first online advertisement and criteria indicating a geographical region limitation indicating that the first advertisement is to be distributed only within one or more specified geographical regions;
receiving over the computer network, at the server, a request for the first advertisement from an audience client device through a first channel of a plurality of advertising channels;

receiving over the computer network, at the server, budget information including an ad campaign budget of an advertiser;

determining, by the server, whether the request meets the criteria;

determining, by the server, which of the first channel and a second channel of the plurality of advertising channels to use to deliver the first advertisement, according to the ad campaign budget;

communicating, by the server, the first advertisement to the audience client device through the first channel, the second channel, or any combination thereof, according to the determination of which channel to use and the determination of whether the request meets the criteria;

storing, by a first storage server, the first advertisement;

delegating, by a distribution server, storage of the first advertisement to a second storage server geographically distributed from the first storage server, the second storage server located within the one or more specified geographical regions, according to respective arrangements between the plurality of advertising channels and the advertiser, the respective arrangements including the geographical region limitation indicating that the first advertisement is to be distributed only within the one or more specified geographical regions; and withholding, by the distribution server, delegation of storing of the first advertisement information to a third server in response to the third server being located outside of the one or more specified geographical regions.

2. The method of claim 1, wherein the plurality of advertising channels includes a plurality of different geographic online advertising channels.

3. The method of claim 1, wherein the first channel is a search engine marketing channel.

4. The method of claim 1, wherein the first channel is a native advertising channel.

5. The method of claim 1, wherein the first channel is a display advertising channel.

6. The method of claim 1, wherein the first channel is a content match channel.

7. The method of claim 1, wherein the first channel is a sponsored search channel.

8. The method of claim 1, wherein the plurality of advertising channels includes a plurality of online advertising channels provided by different online ad service providers.

9. The method of claim 1, wherein the first channel is a search engine marketing channel and the second channel is a display advertising channel.

10. The method of claim 1, wherein the first channel is a display advertising channel and the second channel is a search engine marketing channel.

11. The method of claim 1, wherein the first channel is a content match channel and the second channel is a sponsored search channel.

12. The method of claim 1, wherein the first channel is a sponsored search channel and the second channel is a content match channel.

13. The method of claim 1, wherein the plurality of advertising channels includes a banner ad channel.

14. The method of claim 1, wherein the plurality of advertising channels includes a banner ad channel, a content match channel, a sponsored search channel, or any combination thereof.

15. The method of claim 1, wherein the advertisement information is provided by an advertiser client device.

16. The method of claim 1, wherein the advertisement information includes an indication of the plurality of advertising channels to distribute the advertisement.

17. A system, comprising:

a graphical user interface provided by an advertiser client device of a computer network, the user interface including a field to receive advertisement information including: an indication of an online advertisement, criteria indicating when to distribute the advertisement, a geographical region limitation indicating that the advertisement is to be distributed only within one or more specified geographical regions, and a bid from an advertiser for the distribution of the advertisement when the criteria are met, the bid including an indication of a plurality of advertising channels to distribute the advertisement; and geographically distributed servers, each server being a server of the computer network, and the geographically distributed servers including:

a first storage server, configured to store the advertisement information;

a request receiving server, configured to receive a request for the advertisement from a first channel of the plurality of advertising channels;

an ad determination server, configured to determine whether the request meets the criteria;

an ad forwarding server, configured to communicate the advertisement to an audience client device of the network through the first channel, a second channel of the plurality of advertising channels, or any combination thereof, according to the determination of whether the request meets the criteria; and a distribution server, configured to:
  delegate at least part of the storing of the advertisement information to a second storage server of the geographically distributed servers, the second storage server located within the one or more specified geographical regions, according to respective arrangements between the plurality of advertising channels and the advertiser, the respective arrangements including the geographical region limitation indicating that the advertisement is to be distributed only within the one or more specified geographical regions; and
  withhold delegating storing of the advertisement information to a third server in response to the third server being located outside of the one or more specified geographical regions.

18. The system of claim 17, wherein the ad forwarding server is further configured to:

determine which of the first channel and the second channel to use to deliver the advertisement, according to an ad campaign budget of the advertiser; and communicate the advertisement to the audience client device through the first channel, the second channel, or any combination thereof, according to the determination of which channel to use.

19. The system of claim 17, wherein the plurality of advertising channels includes a plurality of different geographic online advertising channels.

20. The system of claim 17, wherein the plurality of advertising channels include a plurality of online advertising channels provided by different online ad service providers.

21. The system of claim 17, wherein the first channel is a search engine marketing channel.

22. The system of claim 17, wherein the first channel is a native advertising channel.

23. The system of claim 17, wherein the first channel is a display advertising channel.

24. The system of claim 17, wherein the first channel is a content match channel.

25. The system of claim 17, wherein the first channel is a sponsored search channel.

26. The system of claim 17, wherein the first channel is a banner ad channel.

27. A network of geographically distributed servers, comprising:
- a request receiving server configured to receive a request for an advertisement from a channel of a plurality of advertising channels;
- an ad determination server configured to determine whether the request meets ad distribution criteria provided by an advertiser;
- an ad forwarding server configured to:
  - determine which of the plurality of advertising channels to use to communicate the advertisement to an audience client device, according to an ad campaign budget of the advertiser; and
  - communicate the advertisement to the audience client device, according to the determination of which of the plurality of advertising channels to use to communicate the advertisement;
- a first storage server configured to store advertisement information associated with the advertisement; and
- a distribution server, configured to:
  - delegate at least part of the storing of the advertisement information to a second storage server of the network according to respective arrangements between the plurality of advertising channels and the advertiser, the respective arrangements indicating that the advertisement is to be distributed only within the one or more specified geographical regions, the second storage server being located within the one or more specified geographical regions; and
  - withhold delegating storing of the advertisement information to a third server in response to the third server being located outside of the one or more specified geographical regions.

28. The network of claim 27, wherein the plurality of advertising channels includes a plurality of different geographic online advertising channels.

29. The network of claim 27, wherein the plurality of advertising channels include a plurality of online advertising channels provided by different online ad service providers.

30. The network of claim 27, wherein the plurality of advertising channels includes a search engine marketing channel.

31. The network of claim 27, wherein the plurality of advertising channels includes a native advertising channel.

32. The network of claim 27, wherein the plurality of advertising channels includes a display advertising channel.

33. The network of claim 27, wherein the plurality of advertising channels includes a content match channel.

34. The network of claim 27, wherein the plurality of advertising channels includes a sponsored search channel.

35. The network of claim 27, wherein the plurality of advertising channels includes a banner ad channel.

* * * * *